United States Patent [19]
Thomas, Sr.

[11] Patent Number: 5,449,063
[45] Date of Patent: Sep. 12, 1995

[54] MODIFIED DRIVE SYSTEM FOR ENDLESS BELT CONVEYORS WITH ROLLERS HAVING DRIVING, SUPPORTING AND ALIGNING FEATURES

[75] Inventor: James A. Thomas, Sr., Modesto, Calif.

[73] Assignee: Lindberg Corporation, Rosemont, Ill.

[21] Appl. No.: 98,737

[22] Filed: Jul. 28, 1993

Related U.S. Application Data

[63] Continuation-in-part of Ser. No. 718,351, Jun. 19, 1991, Pat. No. 5,282,532, which is a continuation-in-part of Ser. No. 612,072, Nov. 9, 1990, Pat. No. 5,160,020.

[51] Int. Cl.$^6$ ............................................. B65G 23/06
[52] U.S. Cl. ................................. 198/834; 198/494; 198/835; 474/155; 474/188
[58] Field of Search ............... 198/834, 835, 840, 843, 198/848, 494; 474/155, 188

[56] References Cited

U.S. PATENT DOCUMENTS

| | | |
|---|---|---|
| Re. 30,341 | 7/1980 | LaPeyre ................. 198/834 |
| 1,354,553 | 10/1920 | Harter . |
| 1,793,783 | 2/1931 | Drake et al. . |
| 1,854,506 | 4/1932 | Drake . |
| 1,861,840 | 6/1932 | Claghorn . |
| 1,930,584 | 10/1933 | Cope et al. . |
| 2,000,499 | 5/1935 | Roland . |
| 2,186,767 | 1/1940 | Price . |
| 2,413,339 | 12/1946 | Stadelman . |
| 2,524,328 | 10/1950 | Platt et al. ................ 198/848 X |
| 2,591,987 | 4/1952 | Werden ..................... 198/834 X |
| 2,707,403 | 5/1955 | Thomson et al. . |
| 2,859,861 | 11/1958 | Sheehan . |
| 2,885,164 | 5/1959 | Hooper . |
| 3,043,544 | 7/1962 | Hooper . |
| 3,050,178 | 8/1962 | Stone . |
| 3,069,121 | 12/1962 | Hooper . |
| 3,213,703 | 10/1965 | Fitzgerald . |
| 3,250,381 | 5/1966 | Hooper . |
| 3,362,239 | 1/1968 | Kaye et al. .................. 474/155 |
| 3,414,109 | 12/1968 | Clark . |
| 3,430,506 | 3/1969 | Stone . |
| 3,490,119 | 1/1970 | Fukuyama et al. . |
| 3,658,099 | 4/1972 | Daringer . |
| 3,812,732 | 5/1974 | Conrad . |
| 3,859,865 | 1/1975 | Conrad .................... 198/834 X |
| 3,888,131 | 6/1975 | Reid . |
| 3,961,736 | 6/1976 | Fatula . |
| 3,995,487 | 12/1976 | Locke . |
| 4,072,062 | 2/1978 | Morling et al. ............ 198/494 X |
| 4,134,883 | 1/1979 | Mendelsohn et al. ...... 198/835 X |
| 4,140,216 | 2/1979 | Conrad ........................ 198/835 |
| 4,284,409 | 8/1981 | Van Teslaar ................. 474/185 |
| 4,439,173 | 3/1984 | Fokos ....................... 474/185 X |
| 4,449,958 | 5/1984 | Conrad ....................... 474/205 |

(List continued on next page.)

FOREIGN PATENT DOCUMENTS 0207460  1/1987  European Pat. Off. ............ 198/834

OTHER PUBLICATIONS

Declaration by James A. Thomas, Sr. dated Dec. 8, 1992.

Primary Examiner—Joseph E. Valenza
Assistant Examiner—Tuan N. Nguyen
Attorney, Agent, or Firm—Fitch, Even, Tabin & Flannery

[57] ABSTRACT

In one embodiment, the invention comprises at least one and preferably a plurality, of rollers provided with recesses which are mounted on the drive and trailing assemblies of a conveyor system. The recesses of each roller include abutment surfaces angularly disposed relative to the central axes of their respective drive or trailing assemblies and are sized to receive, support and align the belt. Alternative embodiments employing polygonal rollers, rollers with a single wall forming two angled abutment surfaces and rollers with support surfaces disposed to receive multiple belt segments are also provided. The rollers, in addition, may include sets of the recesses distributed in circumferential rows about their periphery, including an odd number of sets of recesses to reduce wear on the roller. A method for estimating the optimum size and configuration of the rollers of the invention for helical woven wire endless belts is also provided.

12 Claims, 8 Drawing Sheets

U.S. PATENT DOCUMENTS

| | | | |
|---|---|---|---|
| 4,509,936 | 4/1985 | Muller | 198/494 X |
| 4,545,778 | 10/1985 | Koivula | 474/188 X |
| 4,589,543 | 5/1986 | Hastem-Muller | 198/834 |
| 4,601,685 | 7/1986 | Delhaes | 474/188 |
| 4,652,474 | 3/1987 | Kraus . | |
| 4,685,557 | 8/1987 | Roinestad | 198/834 |
| 4,821,871 | 4/1989 | Herren | 198/843 |
| 4,837,064 | 6/1989 | Tschudin-Mahrer | 198/835 X |
| 5,025,916 | 6/1991 | Kaminski | 198/834 X |
| 5,040,670 | 8/1991 | Mendoza | 198/834 |
| 5,160,020 | 11/1992 | Thomas, Sr. | 198/834 |
| 5,282,532 | 2/1994 | Thomas, Sr. | 198/835 X |

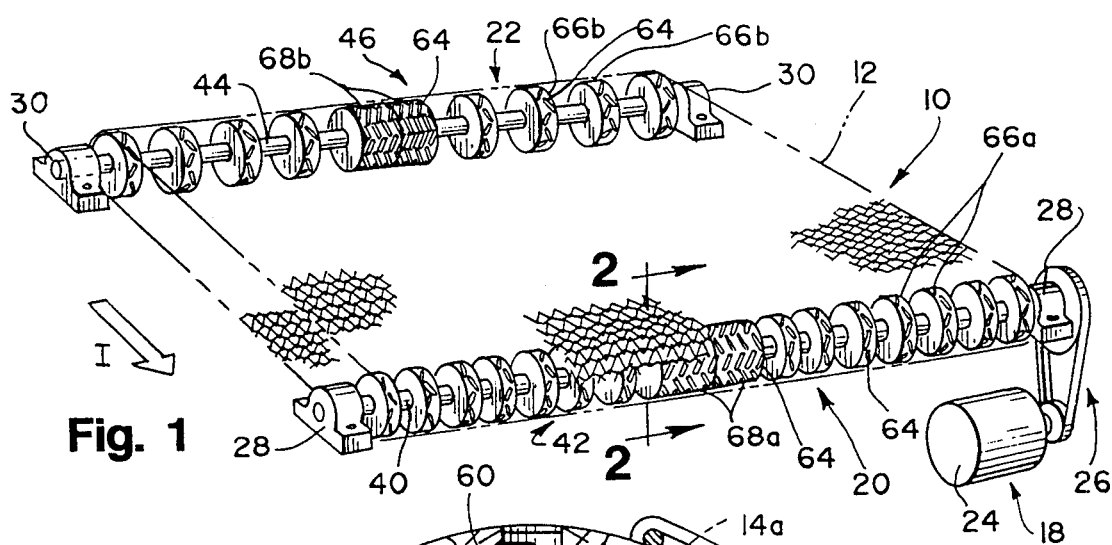
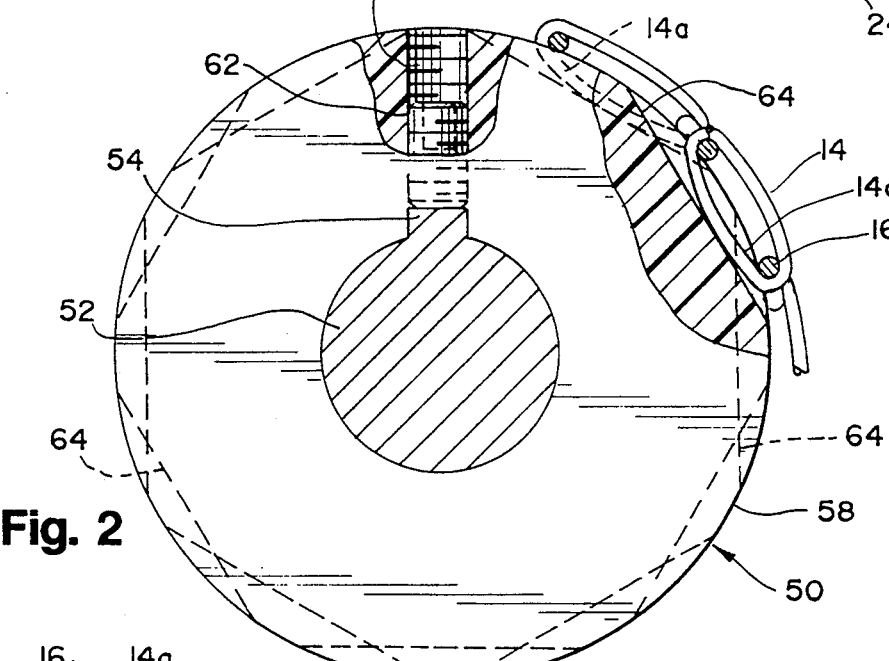
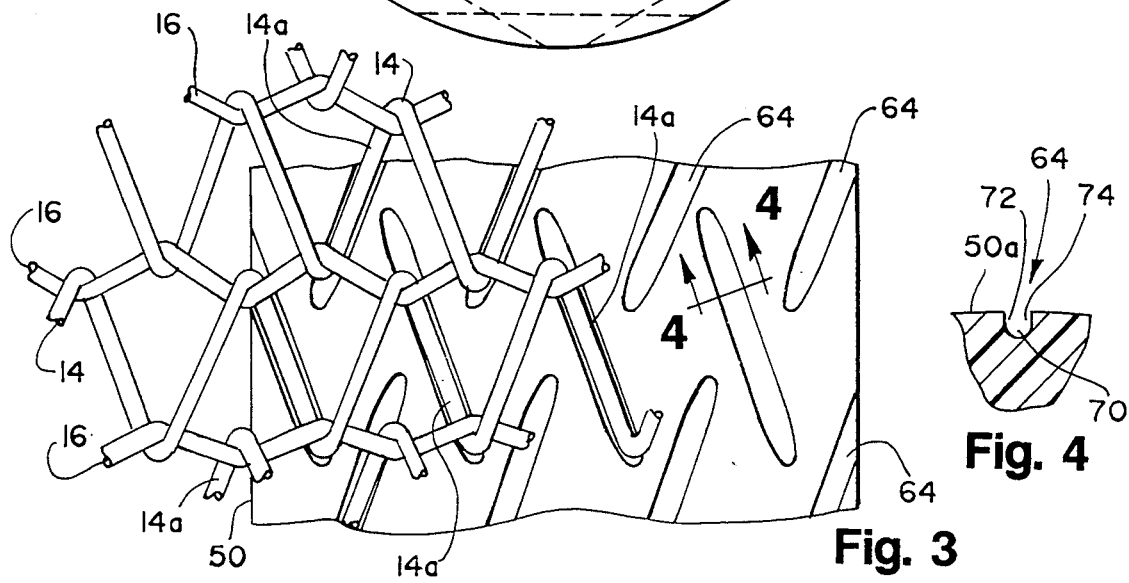

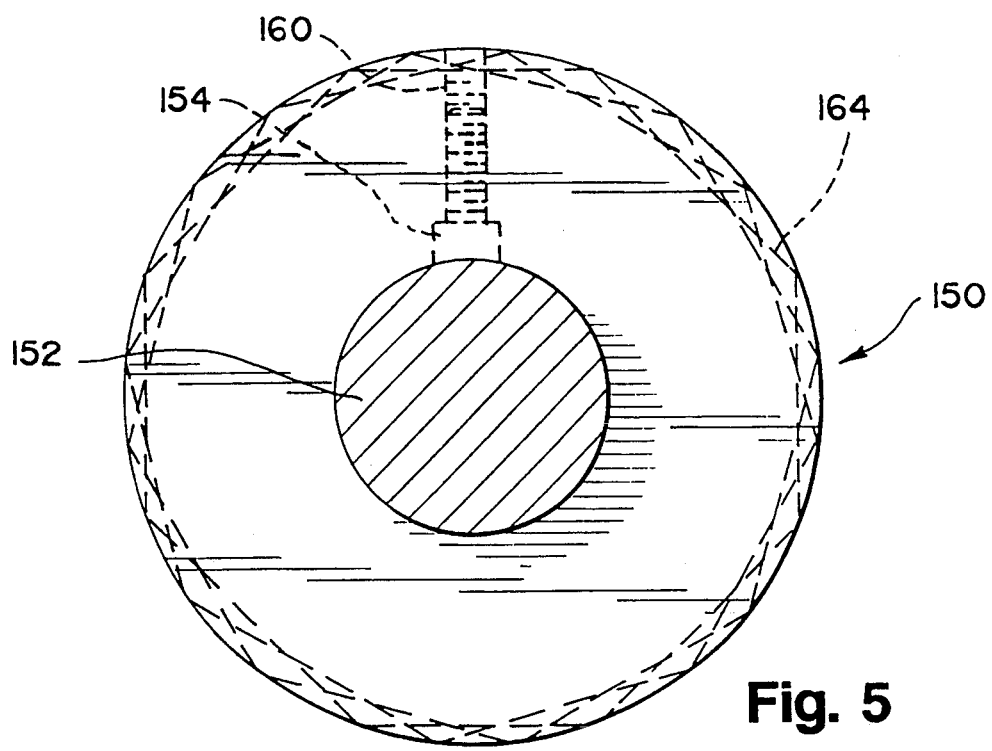
Fig. 5
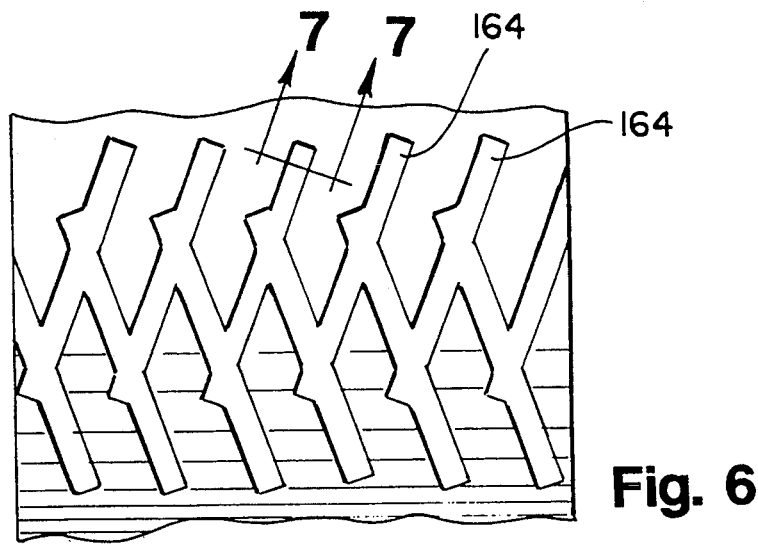
Fig. 6
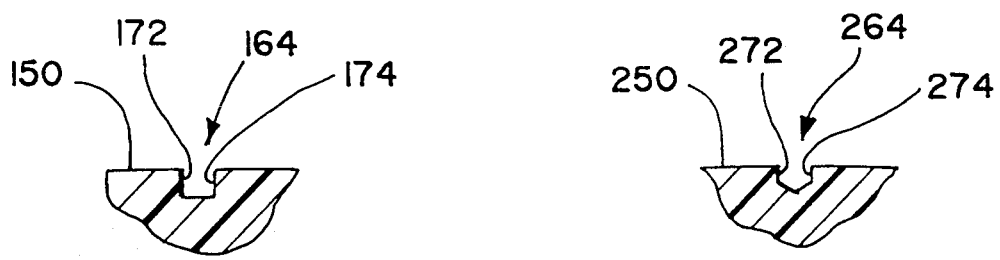
Fig. 7     Fig. 8

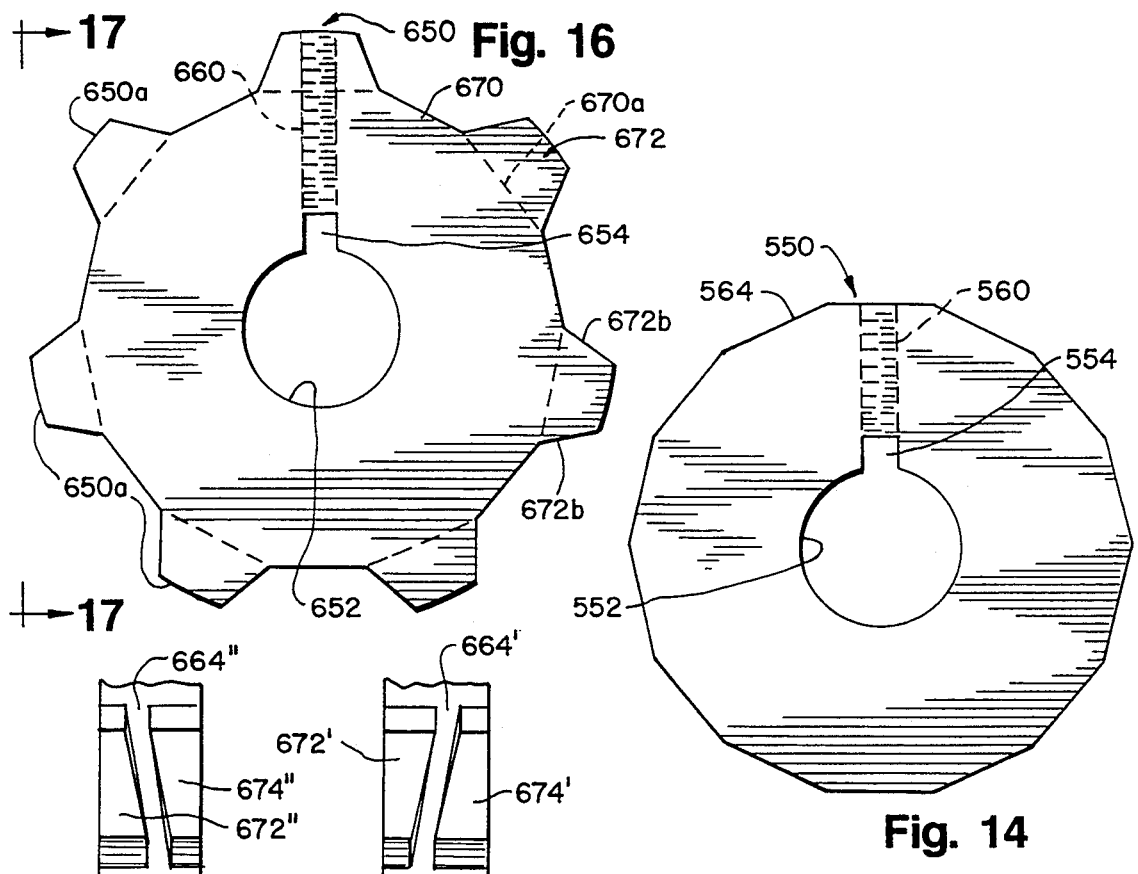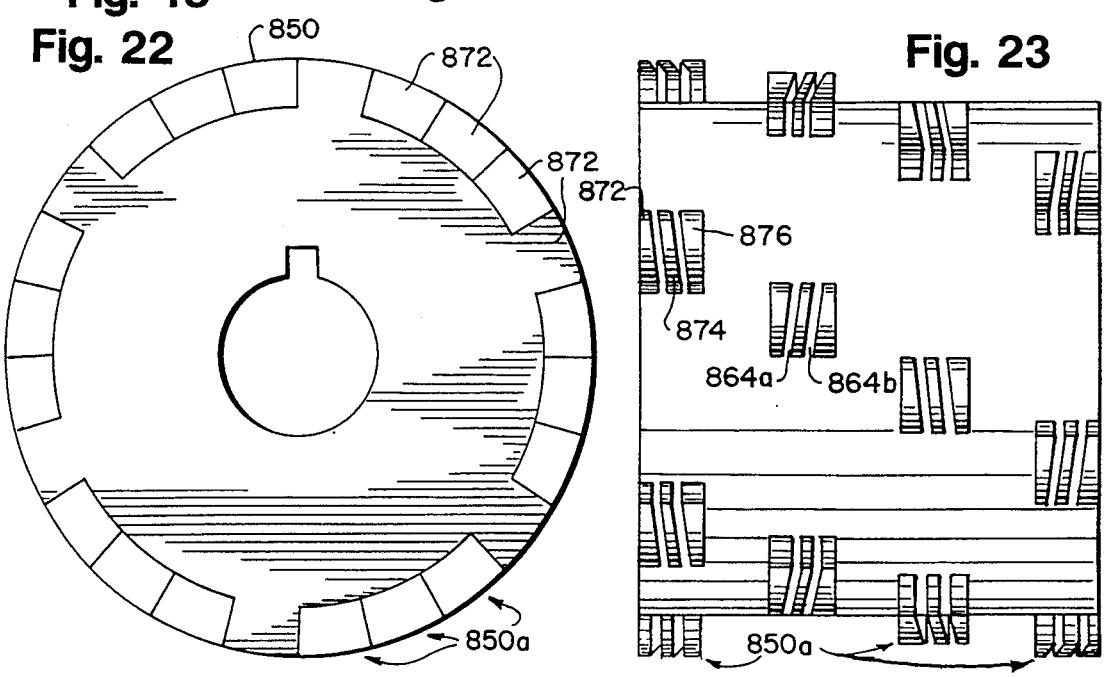

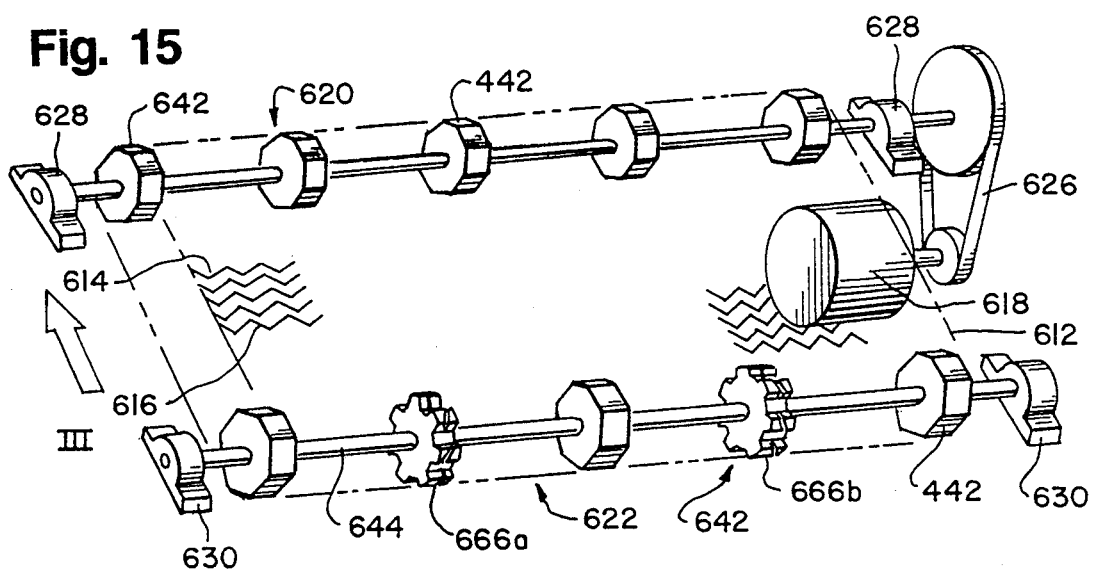
Fig. 15
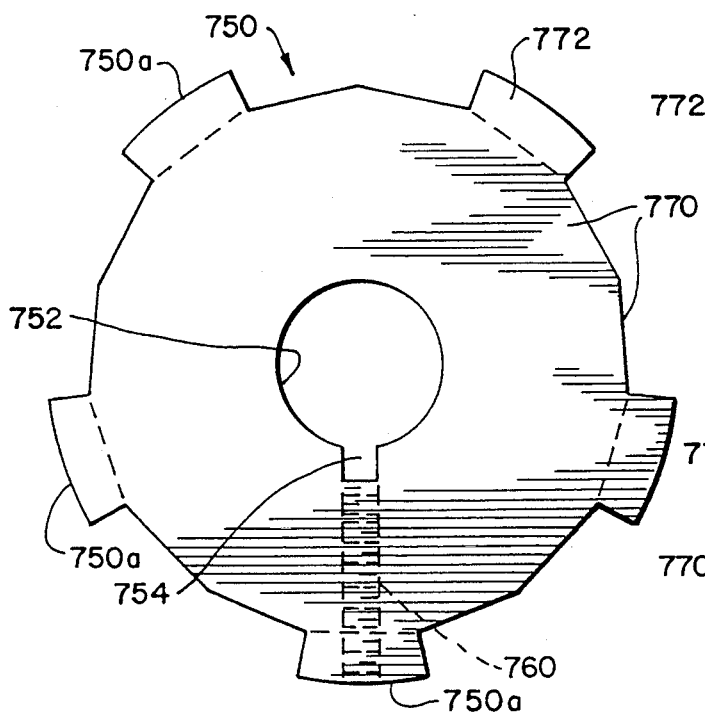
Fig. 20
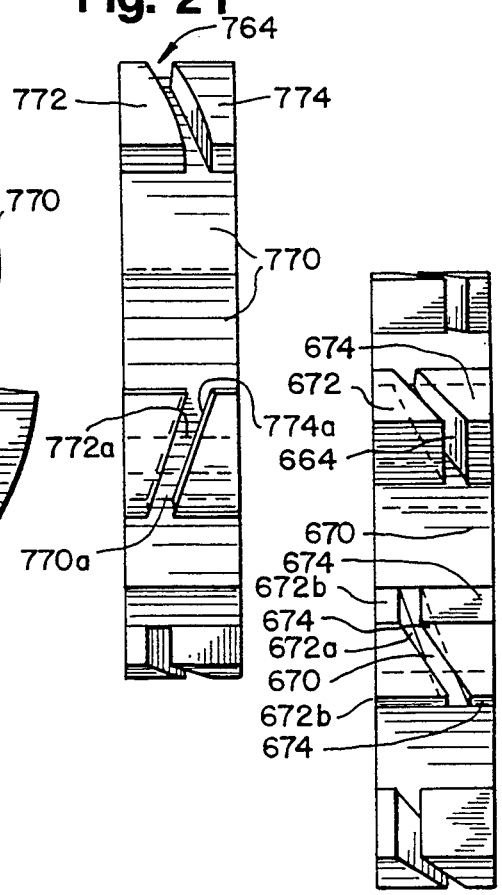
Fig. 21
Fig. 17

MODIFIED DRIVE SYSTEM FOR ENDLESS BELT CONVEYORS WITH ROLLERS HAVING DRIVING, SUPPORTING AND ALIGNING FEATURES

This is a continuation-in-part of application Ser. No. 718,351 filed Jun. 19, 1991, now U.S. Pat. No. 5,282,532, which is a continuation-in-part of application Ser. No. 07/612,072 filed Nov. 9, 1990, now U.S. Pat. No. 5,160,020.

FIELD OF THE INVENTION

An endless belt conveyor system commonly includes the endless conveyor belt, an assembly for driving the belt at the one end of the system and a trailing assembly at the opposite end of the system to support and return the belt to the drive assembly. The drive and trailing assemblies are typically positioned to maintain the belt under the proper operating tension and to provide some, usually limited, lateral guidance to maintain the belt in proper tracking alignment. In some applications, additional intermediate assemblies may also be used to further guide and support the belt.

There are many factors that may adversely affect the operation of the driving and trailing assemblies, particularly in systems using metal belts and helical or spiral weave, woven wire belts. These include the loading requirements of the system, the vertical and horizontal space allowed for the drive and trailing assemblies, the operational temperature of the system, the inclines or side loading areas in the system and the operational conditions of the system (i.e. corrosive conditions, damp conditions, large temperature extremes, loose particles and debris, etc.). The drive and trailing assemblies in such applications must also frequently operate at high speeds for extended periods without adverse effects on the belt tension, belt tracking or belt durability.

In many conveyor systems, the drive and trailing assemblies use a smooth rubber or friction surfaced pulley to engage and propel the belt through the system. These pulleys, however, usually lack the ability to positively engage the endless belt or ensure proper tracking of the belt, and thus are frequently prone to slippage and loss of drive efficiency, particularly when the above factors create a difficult operating environment. Other systems use expensive, and sometimes difficult to maintain, direct drive chain links mounted on the sides of the belt to engage outboard drive sprockets. These systems may reduce belt slippage and increase drive efficiency under extreme operating conditions, but are often not cost effective for the conveyor system manufacturer or the end user.

Relatively expensive and difficult to manufacture toothed sprocket systems have also been used to provide a positive drive for endless belt conveyors. These sprocket systems commonly rely on a limited, single engagement point between the sprocket teeth and the belt. In conveyors subject to substantial temperature ranges and extremes, the differential of thermal expansion between the belt and sprocket frequently interferes with this limited engagement between the toothed sprocket and belt. As a result, such systems may be inefficient, cause mistracking of the belt and fail to provide the belt with sufficient lateral support.

In addition, toothed sprockets are typically operable in only one direction. Thus, it is difficult, if not impossible, to reverse the direction of travel of the endless belt in such systems without rearranging or reworking the sprockets and other major components of the system.

In applications with strict vertical space limitations, as in cooling chambers and other operations using staggered, stacked belts, it is frequently desirable for cost and technical reasons to use woven wire belts with the largest mesh size compatible with the products carried by the belts. When the size of the belt mesh is increased, however, it is usually necessary to increase the diameter of the pulleys used in the system. An estimate used for systems employing drive and trailing pulleys is that the required pulley diameter in inches is equal to 180 divided by the number of mesh openings per linear foot along the length of the belt.

In the case of a belt with 16 mesh openings per linear foot of length, for example, the expected diameter for the pulleys in the system would be at least 11.25 inches. However, the vertical space available for drive and trailing assemblies in staggered, stacked conveyor systems often cannot accommodate pulleys of such sizes. Pulleys with smaller diameters may be used, but this often creates deleterious belt deformations as the belt passes over the pulleys. These deformations may reduce the life of the belt and interfere with the belt alignment, particularly in high speed systems. Consequently, more costly, smaller mesh belts are frequently used in these applications, sometimes at the expense of the operating efficiency of the entire system.

The drive and trailing assemblies, in addition, are often required to maintain the conveyor belt at high tension levels without imposing significant strains on the structural elements of the belt. In some prior art systems, including those using multiple toothed sprockets, the drive and trailing assemblies failed to provide sufficient lateral support to the belt under high belt tension conditions, and in some instances increased the stresses and strains on the belt. In those systems, the belts intermittently dished, stretched, warped or curled during operation of the conveyor system. As a result, the belts were damaged before full scale use of the system commenced, the useful life of the belt and other components of the system were significantly curtailed, and the overall maintenance costs for the system were significantly increased.

The drive and trailing assemblies, furthermore, should be relatively easy to install and maintain. Drive assemblies requiring multiple and complicated components that require extensive start-up efforts and further close attention during operation of the system add substantial, undesirable expense to the overall cost of such systems. Similarly, the drive and trailing assemblies must be cost effective to purchase and include components that are durable and replaceable at a reasonable cost to the original system manufacturer and to the end user.

This invention overcomes the limitations of the prior art to provide an efficient, cost effective conveyor drive system, particularly for systems employing woven wire endless belts. The drive and trailing assemblies (as well as intermediate assemblies) of the invention provide a positive drive for endless belt conveyor systems that supports and maintains the belt in proper tracking alignment, is reversible and prevents undue stress on the belt members during high speed at high tension operations. This invention further provides a drive that is space efficient, suited for different operating conditions, including large temperature extremes and is very flexible in construction and use.

SUMMARY OF THE INVENTION

It is an object of the invention to provide a drive for endless belt conveyor systems that efficiently, supports and advances the endless belt through the conveyor system and aids in maintaining the belt in proper tracking alignment.

It is a further object of the invention to provide a device for an endless belt conveyor system that positively engages the endless belt, is reversible and efficiently advances and supports the belt through the system.

It is also an object of the invention to provide a drive for endless conveyor belt systems that operates effectively and efficiently in a variety of operating conditions, including in systems with relatively high belt loads, temperature ranges and variations, restricted space limitations, side loading, inclines, debris, particulate matter and the like.

It is another object of the invention to provide a drive for endless conveyor belt systems that preserves the structural integrity of the belt, that is easily maintained and that includes replaceable, flexible and relatively inexpensive components.

It is another object of the invention to provide a method for estimating the optimum size and configuration of rollers for the drive and trailing assemblies of the invention.

Further and additional objects will be apparent from the following description, drawings and claims.

In one embodiment, the invention comprises at least one, and preferably a plurality, of slotted rollers mounted on the drive and trailing assemblies of a conveyor system. The slots on each roller are angularly disposed relative to the central axes of their respective drive or trailing assemblies and are sized to receive within the slot a portion of the belt contacting the rollers. The slot bottom and side walls act against the engaged portion of the belt to propel the belt through the system, support the belt and maintain the belt in proper tracking alignment.

The slotted drive rollers are preferably mounted on a powered, rotatable drive shaft, and the slotted trailing rollers are preferably mounted on a free-turning trailing shaft. In some embodiments, additional intermediate assemblies of support shafts and rollers disposed between the drive and trailing assemblies may also be used, and may include take-up rolls and the like.

Each slotted roller, whether for the drive, trailing or intermediate assemblies, preferably comprises a cylindrical body made of a polymeric material such as ultrahigh molecular weight polyethylene or other tough, durable polymers, carbon steel, stainless steels, in some applications woods and rubbers, and other similar materials or combinations of such materials. The rollers may be machined, cast or molded depending on the application and material used.

The roller engagement slots are preferably distributed in circumferential rows about the periphery of the roller and, in multi-row rollers, in a parallel relation across the width of the roller. The engagement slots may be generally square in cross-sectional shape with a flat bottom wall and upwardly extending walls. Alternatively, the slots may include a curved or radiused bottom wall, or a V-shaped or tapered bottom wall. In the preferred embodiment, rollers with slots of different shapes and dimensions may be used in combination depending on their location in the conveyor system and the operational conditions of the system. The rollers also preferably include a set screw well extending through the roller so that an optional set screw may be threaded into the well to fix the roller in place on the drive, trailing or intermediate shafts.

In a preferred embodiment using slotted rollers, for helical, woven wire belts, a combination of multi-row slotted rollers and single-row slotted rollers are used on the drive, trailing and, if applicable, intermediate shafts. In this embodiment, the engagement slots of the rollers are symmetrically disposed about the peripheral surface of the rollers so that the direction of travel of the belt may be reversed without rearranging or rebuilding the drive, tracking or intermediate assemblies. The drive, trailing and intermediate shafts may also be of identical dimensions and the rollers for each may be interchangeable.

One method for estimating the optimum size and configuration of the slotted rollers of the invention for helical woven wire endless belts comprises the following steps: (1) determining the belt mesh chordal pitch; (2) estimating the number of sides of a polygon encompassed by the proposed roller, where the chordal pitch of the polygon is compatible with that of the endless belt; (3) estimating the outer diameter of a cylinder circumscribing the polygonal cylinder; (4) estimating the chordal pitch of the roller; and (5) estimating the overall outer diameter of the roller.

In another embodiment of the invention, the above-mentioned slotted rollers may be used in conjunction with cylindrical, polygonal rollers mounted on the drive and trailing assemblies of the conveyor system. The planar, longitudinal peripheral surfaces or "sides" of these polygonal rollers engage a portion of the belt contacting the rollers to support and drive the belt. The chordal pitch of the polygonal roller is less than, and correlated to, the chordal pitch of the belt. The formula for its calculation is the same as that shown below.

Another embodiment of the invention includes a roller provided with both slots and planar peripheral surfaces. In this embodiment, pairs of protruding side wall segments define slots for engaging portions of a endless belt and are spaced about the periphery of the roller. One or more longitudinal planar surfaces are interposed between each set of wall segments to form "sides" to engage the endless belt. Thus, the roller slots and the planar sides of the roller support, guide and, in some applications, drive the belt during operation of the conveyor system.

When used with helical woven wire belt, the slots of such rollers are preferably disposed at an acute angle to the axis of rotation of the roller corresponding to the angle of the belt helical wires. These slots also may be oriented in a "right-hand" or a "left-hand" direction to correspond with the belt helicals. The number of slots on the rollers and number of planar sides disposed between slots will depend on the belt configuration and the conveyor operating system.

The slot side walls, in addition, are preferably sized to ensure the maximum available engagement surface within the slot, while avoiding deleterious contact with the other portions of the belt. These alternately slotted rollers may further accommodate a single row of slots or multiple circumferential rows of slots spaced across the roller.

An additional embodiment of the invention employs recesses with a single side wall to abut, drive, support and guide the belt. In one version of such an embodiment, the recesses have a bottom wall and the remainder of the recesses are open to encourage the dislodgment of debris from the recesses during operation of the system. In another embodiment, the base of a single side wall is adjacent to a planer supporting surface extending a sufficient distance from the side wall to support one or more belt helicals.

The invention, in addition, is not limited to the above-recited embodiments or to use with woven or flat wire endless belts. Rather it includes the further embodiments discussed and shown below in the drawings, description and claims, and their equivalents.

DETAILED DESCRIPTION OF THE INVENTION

For a more complete understanding of the invention, reference should be made to the drawings wherein:

FIG. 1 is a perspective view of a conveyor system, with parts omitted for simplification and clarity, for a helical, woven wire endless belt employing the claimed invention and including drive and trailing assemblies.

FIG. 2 is a side elevational view of the roller shown in FIG. 1 with fragmentary sectional views of portions of the roller and with a partial section of a helical woven wire endless belt shown.

FIG. 3 is a fragmentary plan view of the roller shown in FIG. 2 with a partial section of helical, woven wire endless belt shown.

FIG. 4 is a sectional view of one of the slots of the roller shown in FIG. 3 through the line 4—4.

FIG. 5 is a side elevational view of an alternative embodiment of a roller, such as that shown in FIG. 2, adapted for a helical woven wire endless belt with smaller mesh openings.

FIG. 6 is a fragmentary plan view of the roller shown in FIG. 5.

FIG. 7 is a sectional view of an alternative embodiment of a roller slot such as may be used in the roller of FIG. 6 through the line 7—7.

FIG. 8 is a sectional view of another alternative embodiment of a slot for rollers such as those shown in FIGS. 3 and 6.

FIG. 14 is a side elevation view of a polygonal roller of the invention, such as shown in FIGS. 11 and 15 with fourteen sides.

FIG. 15 is a perspective view of a conveyor system, with parts omitted for simplification and clarity, for a helical woven wire endless belt employing the claimed invention, including multiple polygonal rollers on the drive assembly and a combination of polygonal rollers and alternately slotted rollers on the trailing assembly.

FIG. 16 is a side elevation view of an alternately slotted roller, such as shown in FIG. 15.

FIG. 17 is a front view of the alternately slotted roller shown in FIG. 16 along line 17—17.

FIG. 18 is top plan view of the side walls defining the slots in the alternately slotted roller shown in FIG. 16 for "right-hand" belt elements.

FIG. 19 is top plan view of the side walls defining the slots in the alternately slotted roller shown in FIG. 16 for "left-hand" belt elements.

FIG. 20 is a side elevation view of another embodiment of an alternately slotted roller.

FIG. 21 is a front view of the alternately slotted roller shown in FIG. 20 along line 21—21.

FIG. 22 is a side elevation view of an additional embodiment of an alternately slotted roller with multiple circumferential rows of slots.

FIG. 23 is a front view of the alternately slotted roller shown in FIG. 22 along line 23—23.

Figure 9:
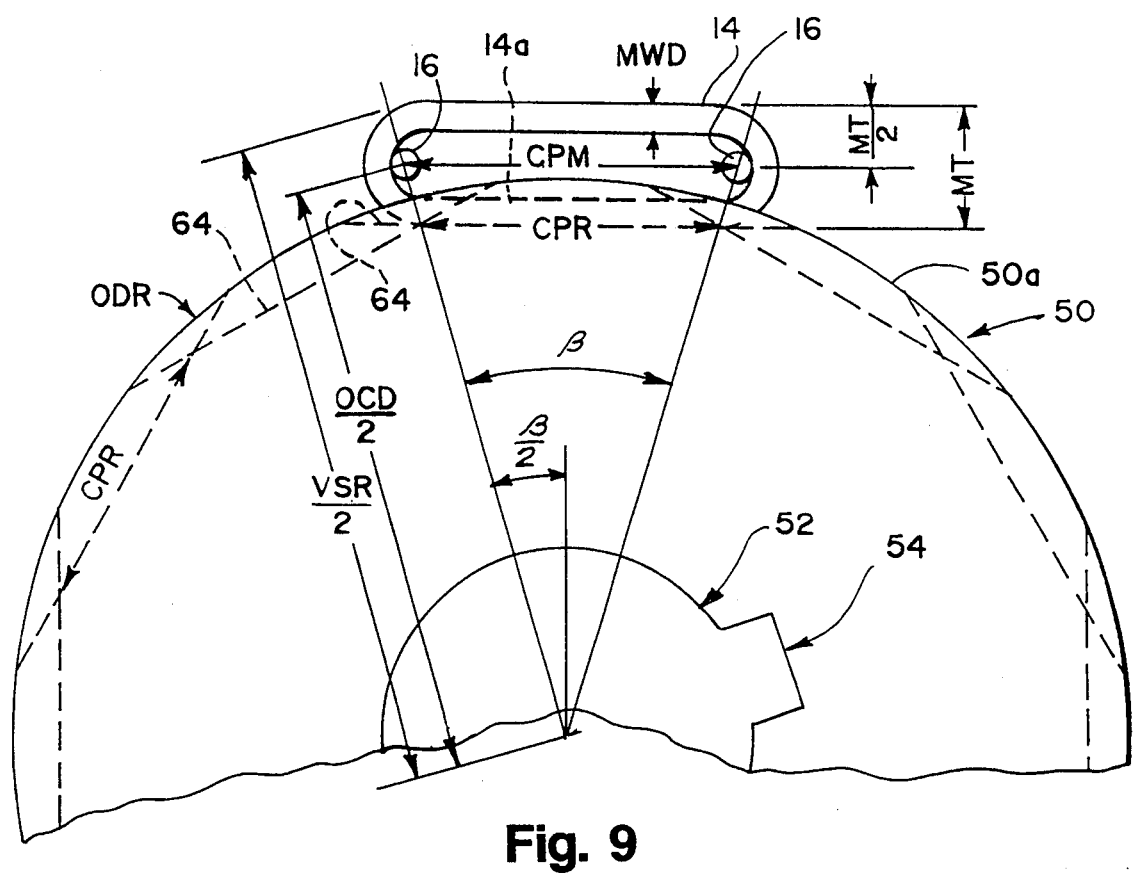
FIG. 9 is an expanded fragmentary side elevational view of a portion of a roller, such as that shown in FIG. 2, describing the dimensions used to estimate the optimum configuration of the roller.

It should be understood the drawings are not necessary to scale. In certain instances, details of the actual structure which are not necessary for the understanding of the present invention have been omitted. It should also be understood that the invention is not necessarily limited to the particular embodiments listed herein.

Referring now to the drawings, and more particularly to FIGS. 1–3, one embodiment of the invention 10 is shown in FIG. 1 adapted for use with a conveyor system employing a helical, woven wire endless belt 12 with a belt travel path I. As shown in FIGS. 2 and 3, such helical, woven wire belts are commonly made of a series of one or more helically wound wires 14 connected by splice wires 16. The belt may be formed, as shown in FIGS. 1–3, to include a balanced series of alternating right-hand and left-hand helical wires 14 joined by crimped splice wires 16, as well as other configurations including semi-closed weaves, double weaves, and compound weaves, with crimped or straight splice wires. Similarly, the invention may be adapted for use with belts of differing constructions such as wire belts with exposed helical or other protruding substructures.

The dimensions of helical woven wire belts, such as that shown in FIGS. 1–3, are commonly described by a three number code such as 18-16-16. The first number (18) designates the helical openings per foot along the width of the belt. The second number (16) designates the helicals (and splices) per foot along the length of the belt. The third number (16) indicates the gauge or diameter of the wire used in the belt. When the splice wire is of a different diameter than the helical wire, an additional number indicating the gauge of the splice wire may be included between the second and third numbers. In the above belt with a 14 gauge splice wire, the belt designation would be 18-16-14-16.

As shown in FIG. 1, the conveyor system for the helical woven wire belt of the Figures includes a drive or power source 18, operatively connected to a drive assembly 20 for advancing the belt 12 through the system and a trailing assembly 22 for supporting and returning the belt 12 to the drive assembly 20. The invention, however, is not limited to that particular system and configuration.

As shown in FIG. 1, the power source 18 may include a drive motor 24, such as an electric motor, hydraulic system, or other such drive sources known to those skilled in the art. The drive motor 24 rotates the drive assembly 20 through a transmission 26, such as the belt and pulley system shown in FIG. 1, a chain and sprocket system, a gear box or other power transmission systems known to those skilled in the art.

The drive assembly 20 is mounted on bearing supports 28 disposed at the outboard ends of the drive assembly 20. The bearing supports 28 may be of various configurations known to the art, and the specific bearing supports 28 used will depend on the operating environment and requirements of the particular conveyor system.

In the embodiment shown in FIG. 1, the drive assembly 20 engages and propels the endless belt 12 around the trailing assembly 22 located opposite the drive assembly 20. The trailing assembly 22 is typically unpowered and serves to support, align and return the belt 12 to the drive assembly 20. The trailing assembly 22 is also mounted on bearing supports 30 similar to, or the same as, the drive bearing supports 26.

The drive 20 and trailing 22 assemblies, in addition, are spaced to ensure that the belt 12 remains under sufficient tension to properly engage the drive 20 and trailing 22 assemblies and to prevent undesirable contact between the belt 12 and other components of the system or other nearby conveyor systems and machinery. Intermediate assemblies, such as take-up rolls, may also be used to maintain the proper belt tension. The needs and uses of a particular system will determine the amount of belt tension required. The invention 10 may be used in a high belt tension systems when it is necessary to conserve space and to adequately support the goods carried by the belt 12. The invention 10 may also be used with intermediate or low belt tension systems.

As shown in FIG. 1, the drive assembly 20 preferably includes at least one rotatable drive shaft 40 linked to the transmission system 26. A series of drive rollers 42 are spaced along the length of the drive shaft 40. Similarly, the trailing assembly 22 preferably includes at least one unpowered, freely rotatable trailing shaft 44 and trailing rollers 46 spaced along the length of the trailing shaft 44. In some circumstances and configurations, it may also be desirable to employ multiple driving, trailing or intermediate shafts with accompanying rollers. The degree of cooperation between the assemblies, their configuration and their disposition in such systems will depend on the particular application.

In a preferred embodiment, the drive and trailing shafts 40 and 44 are made of tough, durable materials such as carbon steels or stainless steels, although other materials may be used. The drive 42 and trailing rollers 46 are preferably made of ultra-high molecular weight polyethylene or another tough durable material such as carbon steel, iron, stainless steel, polymeric materials, etc., and in some applications, woods, rubbers or combinations of the above-mentioned materials.

The drive and trailing rollers 42 and 46 may be machined from solid stock, tube or extruded materials, or they may be molded or cast from other suitable materials. The particular materials used for the shafts 40 and 44 and the rollers 42 and 46 will depend on the specific application of the invention and the specific operating conditions. In most applications, the drive 42 and trailing 46 rollers are preferably of similar construction.

A sectional view of a roller 50 suitable for use as a drive 40 or a trailing 42 roller is shown in FIG. 2. The roller 50 is preferably provided with a central bore 52 with a keyway 54 disposed to receive a key flange of the drive or trailing shafts 40 or 44. The central bore 52 is preferably sized to permit the slidable movement of the roller 50 along the length of the shafts 40 or 44. With this arrangement, the roller 50 may be easily positioned, removed or replaced on the shafts 40 or 44 depending on the system requirements.

The roller 50 is also preferably provided with a radially extending set screw well 60 in communication with the keyway 54. This well 60 is threaded to receive a set screw 62 to lock the roller 50 in place on the shafts 40 or 44. The set screw 62 is optional in applications where it may be desirable to allow the lateral movement of the roller 50 during operation of the conveyor system. The movement of the roller 50 may also be laterally restrained with welds, clips, stops, locking members or other equivalent means.

As shown in FIGS. 1-4, the roller 50 is further provided with a plurality of engagement recesses, such as engagement slots 64 or similar structures. These recesses or slots 64, are arranged in at least one circumferential row about the periphery of the roller 50. As shown in FIGS. 2 and 3, the slots 64 are preferably spaced at regular intervals around the periphery of the roller 50. As shown in the alternative embodiment of the roller 150 depicted in FIG. 5, the peripheral spacing of the slots may be varied and will depend on the specific belt 12 used and, in the case of helical woven wire belts, the size of the belt mesh openings.

As shown in FIGS. 1 and 3, the width of the roller 50 may be limited to that required for only a portion or all of a single circumferential row of slots 64, or may accommodate a plurality of juxtaposed circumferential rows of engagement slots 64, with the slots 64 of each row in a parallel relation to the slots 64 of the adjacent rows. In FIG. 1, the preferred drive assembly 20 for a helical, woven wire belt includes a series of fourteen single row drive rollers 66a spaced on each side of a pair of multi-row drive rollers 68a, here with four rows of slots 64. In the preferred embodiment, the four-row drive rollers 68a are locked in a side by side, abutting relation and the seven single-row rollers 66a are locked in an evenly spaced relation on either side of the pair of four row rollers 68a across the remaining width of the belt.

The number of rollers, the number of circumferential rows of slots per roller, and the spacing of multiple rollers (when used) will depend on the particular application. As shown in FIG. 1, it may be preferable to place the wider, multi-row drive rollers 68a in a central location on the drive shaft 40 to support the center of the belt 12 and maximize the available drive force transferable from the drive assembly 20. The single-row rollers 66a on either side of the multi-row rollers 68a support the belt 12, maintain the belt 12 in proper tracking alignment and aid in driving the belt 12. Other configurations include, for example, combinations of one or more multi-row driver rollers 68a spanning all or part of the length of the drive shaft 40 as a series of single-row rollers 66a spaced across the length of the drive shaft 40.

Similar considerations apply to the trailing assembly 22. As shown in FIG. 1, the trailing shaft 44 adapted for use with the helical woven wire belt supports two centrally located multi-row rollers 68b, here with four rows, and four single-row rollers 66b on either side of the multi-row rollers 68b. The trailing assembly 22 may also employ other combinations of rollers, such as multi-row rollers 68b spanning all or a part of the trailing shaft 44 or a series of single row rollers 66b spaced along the trailing shaft 44. The trailing assembly 22 supports and aligns the belt 12 and may, in some applications, incorporate drive motors or the like to transmit or further propel the belt 12 through the conveyor system.

In systems with large temperature ranges or extremes, it is often preferable to employ spaced single row rollers 66 with a width correlated to the coefficients of thermal expansion of the belt 12 and the rollers 50, or spaced combinations of such single row rollers 66 and multi-row rollers 68 on both the drive 20 and trailing 22 assemblies. With such an arrangement, the engagement between the roller slots and belt helicals 14, discussed below, is maintained and the effect of differences in thermal expansion rates between the rollers 66 and 68 and the belts is reduced, particularly in systems where the differences in thermal expansion ratios of the rollers and the belt is significant.

As shown in the Figures, particularly 3, 6 and 10, the slots 64 are preferably spaced, and disposed at an angle relative to the direction of travel I of the belt 12. The spacing and angles of the slots 64 correspond to the portions or elements of the endless belt 12 that engage the roller 50. As shown in FIG. 3, the engagement slots 64 of the roller 50 are disposed at an angle corresponding to the angle of the helical sections 14 of the woven wire belt 12, and are spaced to receive the lower portions 14a, having a first longitudinal side and a second opposite longitudinal side, within the slots 64. As shown in FIGS. 2 and 3, the slots 64 in the preferred embodiment are also symmetrically spaced laterally along, and circumferentially about, the periphery of the roller 50 to correspond to the spacing of the helical sections 14 of the belt 12.

This placement of symmetrical slots 64 in a uniform and symmetrical pattern in the preferred embodiment, and the slot dimensions mentioned below, permits the reversible operation of the roller 50. Unlike prior toothed sprocket systems, systems employing the rollers 50 of the invention may be operated in either a forward or reversed belt travel direction without substantial modification of the system.

As shown in FIG. 4, the slots 64 comprise a bottom wall 70 connecting first 72 (left) and second 74 (right) parallel spaced, upwardly extending side walls. In the preferred embodiment, the side wall spacing is approximately twice the gauge of the helical wire 14. This spacing allows for some variance in the placement of the helical sections 14 of the belt 12 within the slot 64 during operation of the system and compensates for differing thermal expansion rates between the belt 12 and roller 50. The width of the slot opening also allows use of belts with somewhat differing configurations and gauge with a common roller configuration and design.

In the preferred embodiment for helical woven wire belt systems, the slot bottom wall 70 is spaced sufficient distance from the outer peripheral surface 50a of the roller 50 to accommodate the full lower portion 14a of a turn or "loop" of the helical wire 14. As shown in FIGS. 3 and 4, the left 72 and right 74 walls are angularly disposed to match the pitch of the helix loops of the wire 14 and thereby provide an angular linear engagement. Generally, this will approximate, but be less than one-half of the vertical height of the helix loops. In other systems, more or less of the portion of the belt engaged by the slots 64 will be disposed within the slots 64.

In many applications, as shown in FIG. 9, particularly for woven wire mesh belt systems, the bottom walls 70 of the slots 64 can be viewed as falling along a series of chordal planes defining a cylindrical regular polygon encompassed by the outer periphery of the roller 50. Each bottom wall 70 of the roller 50 can be viewed as falling along one chordal engagement surface of the polygon. Thus, the roller 50 of FIG. 2, with 12 slots, encompasses a 12 sided polygon with 12 chordal engagement surfaces.

As shown in FIGS. 2 and 3, the slots 64, in addition, preferably extend along the peripheral surface of the roller 38 at least a sufficient distance to accommodate the maximum length of the bottom portion 14a of the helix loops within the slots 64. This distance will depend on the chordal length of the helix loops, the belt type, dimensions and gauge, the method used to fabricate the roller, and the particular application. The slots may be of the same length, of differing lengths, or combinations of lengths.

As shown in FIGS. 4, 7 and 8, the configuration of the slot 64 may also be varied for differing applications. In FIG. 4, the bottom wall 70 is curved or radiused. In another embodiment shown in FIG. 7, the bottom wall 170 is planar with upwardly extending side walls 172 and 174 normal to the bottom wall 170. In a third embodiment shown in FIG. 8, the bottom wall 270 is V-shaped or tapered, with upwardly extending side walls 272 and 274.

The radiused and tapered slot configurations shown in FIGS. 4 and 7 provide optimal centering of the helix loops of the belt 12 within the slots 64 to maintain the belt 12 in proper tracking alignment during operation of the system. The square configuration shown in FIG. 7, does not center the helical sections 14 as effectively, but allows a wider tolerance for twisting or wavering of the helix loops of the belt 12 within the slots 64 and for differing thermal expansion rates between the roller 50 and belt 12.

In the preferred embodiment of the invention shown in FIG. 1, as adapted for a low belt tension system, the single-row 66a drive rollers, the multi-row 68a drive rollers and the single-row trailing rollers 66b were provided with radiused slots such as those shown in FIG. 4 to enhance the drive and tracking functions of the drive and trailing assemblies 20 and 22. The multi-row trailing rollers 68b were provided with square slots such as those shown in FIG. 7 to enhance the support functions of the trailing assembly 22.

An alternative embodiment of a roller suitable for use in a drive 20 or trailing 22 assembly is shown in FIGS. 5 and 6. This multi-slot roller 150 is also provided with a central bore 152, keyway 154 and set screw well 160 each adapted for mounting the roller 150 on a drive shaft 40 or trailing shaft 44 as discussed above. The slots 64 of this embodiment are circumferentially and laterally disposed to engage a helical, woven wire belt with smaller mesh openings, and thus more closely spaced helix loops than the embodiment shown in FIGS. 1–3.

As shown in FIGS. 1–3, in operation with a helical, woven wire endless belt 12, the drive and trailing assemblies 20 and 22 are spaced to put the belt 12 under sufficient tension to ensure firm engagement between the belt 12 and the drive and trailing rollers 42 and 46. As the belt 12 wraps around and passes over the drive rollers 42, a plurality of helix loops are received within a corresponding slots 64 on the drive rollers 42. The forward rotation of the drive rollers 42 causes the bottom walls 70 and one or both of the left or right side walls 72 and 74 of each slot 64 to contact and propel forward the helix loops, and thus the belt 12, within the system.

The angled disposition of slots 64 relative to the direction of travel of the belt 12 and the engagement of multiple helix loops of the belt 12 by the slots 64 provides substantial engagement between the helix loops and the rollers 42 and 46 to efficiently transfer the rotational movement of the rollers 42 and 46 to the belt 46. The angled slots 64 further tend to restrain the lateral motion of the belt 12 across the rollers 42 and to prevent, or correct, any tracking misalignment of the belt 12 during operation of the system.

The multi-row drive rollers 66a support the center of the belt 12 and contribute substantially to the drive and aligning action provided by the drive assembly 20. The single row drive rollers 66b, and their respective slots 64, on either side of the multi-row rollers 66a further support the belt 12 along its width to prevent the belt 12 from sagging and the edges of the belt 12 from curling due to unequal distribution of the belt weight and tension over the drive assembly 20. The single row drive rollers 66a also contribute to the drive and self-aligning action provided by the drive assembly 20.

As the belt 12 passes over the trailing rollers 46 to return to the belt to the drive rollers 42, the belt helix loops also fall within the slots 64 of the trailing rollers 46. The trailing rollers 46, like the drive rollers 42, act to support the belt 12 and to maintain the belt 12 in proper alignment. When the trailing rollers 46 are locked in place, the slot bottom walls 70, side walls 72 and 74 of the trailing rollers 46 collectively urge the helix loops, and thus the belt 12, into the proper tracking position relative to the other components of the conveyor system. The multi-row trailing rollers 68b support and align the center of the belt 12, and the single row trailing rollers 68a support and align the belt 12 across the width of the belt 12.

While not shown in the drawings, intermediate assemblies using rollers, and combinations of rollers, as shown in FIGS. 1–8 may also be used to support and guide the belt during its travel between the drive and trailing assemblies 32 and 36. Such assemblies may employ rollers of a similar configuration as the drive and trailing assemblies 20 and 22 or may be tailored for specific applications. Similarly, the number, type and arrangement of the rollers for such intermediate assemblies may also be adapted for the particular conveyor system and operating conditions.

Method For Estimating Roller Configuration

In designing rollers suitable for use in systems using helical woven wire belts, such as those shown in FIGS. 1–8, a number of factors could be taken into consideration. These include the optimum outer diameter of the roller in view of the space available in the specific system, the chordal pitch of the belt, the horizontal pitch of the belt (mesh or helix loop count across the width of the belt), the mesh or helix loop height (the thickness of the belt), the mesh wire gauge diameter, and the pitch angle of the helix loops. Other considerations may include the belt load and speed requirements, the smoothness of travel of the belt over the rollers (particularly along the pass line), the belt travel requirements and the power available to the system.

For many such systems, the minimum vertical space required by the combination of rollers and belt may be estimated using calculations based on the belt dimensions. As shown in FIG. 9, these estimates use the chordal pitch and the mesh thickness of the belt to estimate the maximum number of sides of the cylindrical polygon encompassed by the roller mentioned above. The dimensions of this polygonal cylinder and those of the belt are then used to determine the optimum outer diameter of the drive roller and the slot depth. These estimates may then be used to confirm the minimum vertical space required by the rollers and belt in combination.

Figure 10:
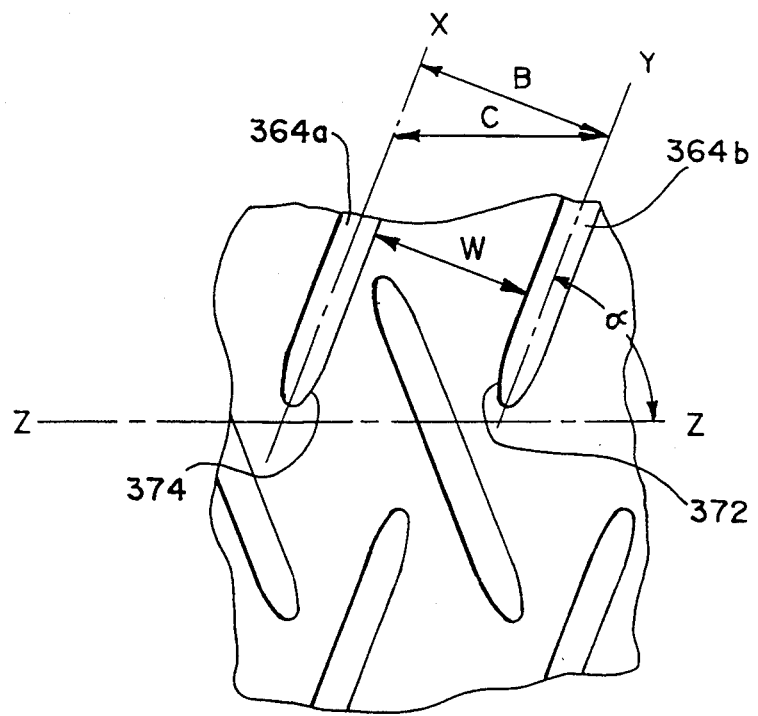
FIG. 10 is an expanded fragmentary plan view of a portion of the roller shown in FIG. 3 noting dimensions used to estimate the proper slot spacing on multi-row rollers.

The angle of the slots of the rollers are estimated by direct measurement of the belt. In the case of helical woven wire belts, this measured angle will generally be less than expected due to the twist in the helix loops as shown in FIG. 3. As shown in FIG. 10, the minimum distance between the slots is estimated from the slot angle and the slot opening width.

These estimates may then be confirmed by actual prototypes. Where necessary, the dimensions and the configurations of the prototype rollers may be adjusted to best suit the particular conveyor system and operating conditions.

Example Of A Calculated Estimate Of The Optimum Roller Diameter

One embodiment of the invention was designed for an 18-16-16 endless belt, with a mesh or helix loop helical thickness of 0.300 inches. The available vertical space (VS) for the roller and belt combination was assumed to be 3.250 inches. An estimate of the diameter of a prior art pulley for such a belt is 180°/16 (the helicals per foot along the length of the belt) or 11.25 inches, which exceeds the available vertical space. Using the method described below, the rollers of the invention were found to have an estimated outer diameter of 2.749 inches and require only approximately 3.209 inches of vertical space which is well within the system requirements.

With reference to FIG. 9, the first step in estimating the dimensions of the rollers is to determine the belt mesh chordal pitch (CPM) using the following calculation:

$$CPM = 12 \text{ inches}/LP \qquad (1)$$

CPM = The mesh chordal pitch, or length from one central axis of the splice wires connecting the belt helix loops to that of the next splice wire along the length of the belt LP=The linear pitch or number of helix loops per linear foot along the length of the belt (the second number of the belt designation)

In the example, the belt mesh chordal pitch (CPM) of the 18-16-16 belt is determined as follows:

$$CPM = 12 \text{ inches}/16 = 0.75 \text{ inches} \quad (1)$$

Next, the dimensions and central angles ($\beta$) of the polygonal cylinder encompassed by the proposed roller (as mentioned above) are estimated from a series of trial calculations using the mesh chordal pitch (CPM), the mesh or helix loop thickness (MT) and the maximum vertical space (VSR) allowable for the proposed roller. These dimensions are used to calculate the trial chordal pitch (TCP) of a series of trial polygonal cylinders with differing numbers of sides and differing central angles ($\beta'$) using the formula below. The trial polygonal cylinder with a trial chordal pitch (TCP) most closely approaching, but not less than, the belt mesh chordal pitch (CPM) is the polygonal cylinder with the optimum number of sides and the optimum central angles ($\beta$) for the proposed roller.

$$TCP = \frac{VS - [\text{secant } (1/2\beta') \times MT]}{\text{cosecant } (1/2\beta')} \quad (2)$$

TCP = chordal pitch of the trial polygonal cylinder
VS = maximum vertical space allowable for the proposed roller with 180° of belt wrapped around the roller
MT = mesh thickness
$\beta'$ = trial central angles of the trial polygonal cylinder The trial central angles $\beta'$ of the trial polygonal cylinder are determined by the following formula; the secant and cosecant values of $\frac{1}{2}\beta'$ can be found in trigonometric tables:

$$\alpha' = \frac{360°}{TNS} \quad (3)$$

TNS = number of sides of the trial polygonal cylinder

As shown below, the trial chordal pitches (TCP) of trial polygonal cylinders with 11, 12 and 13 sides are calculated to determine the maximum number of sides of the polygonal cylinders encompassed by the proposed roller in view of the mesh chordal pitch (CPM) of the belt (as calculated above):

| No. Of Trial Polygon Sides | Chordal Pitch of Trial Polygon |
|---|---|
| 11 sides ($\beta' = 32.727°$) | $TCP = \frac{3.25 - (1.0422 \times .300)}{3.5494} = .827$ in. (2) |
| 12 sides ($\beta' = 30°$) | $TCP = \frac{3.25 - (1.0353 \times .300)}{3.8637} = .761$ in. (2) |
| 13 sides ($\beta' = 27.692°$) | $TCP = \frac{3.25 - (1.0299 \times .300)}{4.1785} = .704$ in. (2) |

The trial chordal pitch (TCP) for the 12 sided polygonal cylinder of 0.761 inches is closest to, but not less than the mesh chordal pitch (CPM) of 0.75 inches for the woven wire belt of the example. Thus, the best polygonal cylinder to estimate the optimum diameter of the proposed roller for the 18-16-16 belt is the 12 sided polygonal cylinder with central angles ($\beta$) of 30°.

Then, the outer diameter (OCD) of a cylinder circumscribing the polygonal cylinder derived from the above calculations is estimated with the following calculations:

$$OCR = CPM / [\text{sine } (\tfrac{1}{2} \times 360°/N) \times 2] \quad (4)$$

$$OCD = 2 \times OCR \quad (5)$$

N = number of sides of the polygonal cylinder
OCR = radius of circumscribing cylinder
OCD = diameter of circumscribing cylinder In the example for the 18-16-16 belt, the outer diameter of the circumscribing cylinder (OCD) is calculated as follows:

$$OCR = .75 / \left[ \text{sine} \left( 1/2 \times \frac{360°}{12} \right) \times 2 \right] = 1.449 \text{ in.} \quad (4)$$

$$OCD = 2 \times 1.449 = 2.898 \text{ in.} \quad (5)$$

From the diameter of the circumscribing cylinder (OCD), above and the belt mesh thickness (MT), the chordal pitch of the proposed roller (CPR) is estimated with the following calculation:

$$CPR = \quad (6)$$

$$\left[ \frac{OCD}{2} - \left( \frac{MT}{2} \times \text{secant } (1/2\beta) \right) \right] \times [\text{sine } (1/2\beta) \times 2]$$

CPR = chordal pitch of the proposed roller
In the example for the 18-16-16 belt, the CPR is calculated as follows:

$$CPR = [1.449 - (0.15 \times 1.0353)] \times 0.5176 = 0.6696 \text{ in.} \quad (6)$$

Next, the optimum overall outer diameter of the roller (ODR) is estimated with the following formula:

$$ODR = 2 \times \left[ \left( \frac{CPR}{2} / \tan (1/2\beta) \right) + (2 \times MWD) \right] \quad (7)$$

ODR = Overall outer diameter of the roller
MWD = The approximate diameter or gauge of the wire of the helical mesh, adjusted to allow clearance in the ODR for the helical splice wires The optimum overall outer diameter of the roller for the example is estimated as shown below. The belt mesh wire diameter (MWD) for the 16 gauge wire used in the 18-16-16 belt is 0.0625 inches.

$$ODR = 2 (1.2494 + 0.125) = 2.749 \text{ inches} \quad (7)$$

The vertical space (VSR) required for the proposed roller, in combination with 180° of belt wrapped around the roller, may be confirmed using the central angle ($\beta$) of the roller, chordal pitch of the belt mesh (CPM) and mesh thickness (MT) with the following estimate:

$$VSR = [CPM \times (\text{cosecant}(\tfrac{1}{2}\beta)) + [MT \times \text{secant } (\tfrac{1}{2}\beta)] \quad (8)$$

VSR = Vertical space of the roller with 180° of belt

For the proposed roller of the example, the estimated vertical space of the roller and belt combination (VSR) is as follows:

$$VSR = (0.75 \times 3.8637) + (0.300 \times 1.0353) = 3.209 \text{ in.} \quad (8)$$

The available space for the roller and belt assembly was assumed to be 3.250 inches. Thus, the above calculation confirms that the estimated dimensions of the roller in the example satisfy the maximum vertical space requirements of that system.

Example Of Estimate Of Roller Engagement Slot Disposition And Dimensions

As discussed above, disposition of the engagement slots of the rollers may be estimated by measurements of the belt and by calculations based on those measurements. With helical woven wire belts, the angles of the engagement slots relative to the belt and drive shaft must be determined by protracting the actual helix loops. A rough calculation based on the mesh count of the belt may be used, but must be corrected to account for the twist in the helix loops.

For the example of an 18-16-16 belt, the slot angle calculated from the theoretical pitch angle of the helix loops as determined from the mesh count (16) is 23.94°. The actual pitch angle as measured on an Alloy Wire Belt Co. galvanized 1008 steel wire belt is 20°. Similarly, for a 36-36-17-18 belt, the theoretical helix loop pitch angle is 26.57°, while the actual pitch angle as measured on an Alloy Wire Belt Co. 304 stainless steel belt is 19°. Variations in the belt manufacture, belt materials, as well as the shape and disposition of the belt members may also affect this angle.

As discussed above, the width of the slot opening, i,e., the distance between the side walls 72 and 74 in FIG. 4, is preferably twice the wire gauge of the belt helix loops. In the example of an 18-16-16 belt, the preferred slot width for a 16 gauge wire belt (0.0625 inches) would be 0.125 inches from slot side wall 72 to side wall 74.

The spacing of the slots on multi-row rollers for a helical woven wire belt, such as in the example, is determined from the horizontal mesh count of the belt (HML) and the angle ($\beta$) of the slot relative to the axis of the roller Z—Z. As shown in FIG. 10, the distance (C) between the center lines X and Y of slots 364a and 364b on a line parallel to the axis of rotation of the roller Z—Z is estimated by the following formula:

$$C = 12 \text{ inches/HML}. \quad (9)$$

C = the distance between the center lines X and Y of the slots 364a and 364b on a line parallel to the axis of the rotation of the roller HML = the horizontal mesh count, or helix loop count per foot along the width of the belt.

In the example of an 18-16-16 belt, the distance C is calculated as follows:

$$C = 12 \text{ inches}/18 = 0.667 \text{ inches} \quad (9)$$

As shown in FIG. 10, the distance between the center lines X and Y of the slots on a line perpendicular to the center lines is determined using the following formula:

$$B = (\text{cosine } \alpha) \times C \quad (10)$$

B = distance between the center lines X and Y, on a line perpendicular to the center lines.
$\alpha$ = is the slot angle corresponding to the actual pitch angle of the belt helix loops as discussed above.

In the example of an 18-16-16 belt, the measured helical angle for an Alloy Wire Belt Co. galvanized 1008 steel belt is 20° and B is calculated as follows:

$$B = (\text{cosine } 20°) \times 0.667 = 0.627 \text{ in} \quad (10)$$

As shown in FIG. 10, the space between the right side wall 372 of slot 364a and the left side wall 374 of slot 364b is estimated with the following formula:

$$W = B - SW \quad (11)$$

W = the distance between the right side wall of one slot and the left side wall of an adjacent slot.
SW = the slot width as discussed above.

In the example of an 18-16-16 belt, the distance between side walls of the slots W is calculated as follows:

$$W = 0.627 - 0.125 = 0.502 \text{ inches} \quad (11)$$

Figure 11:
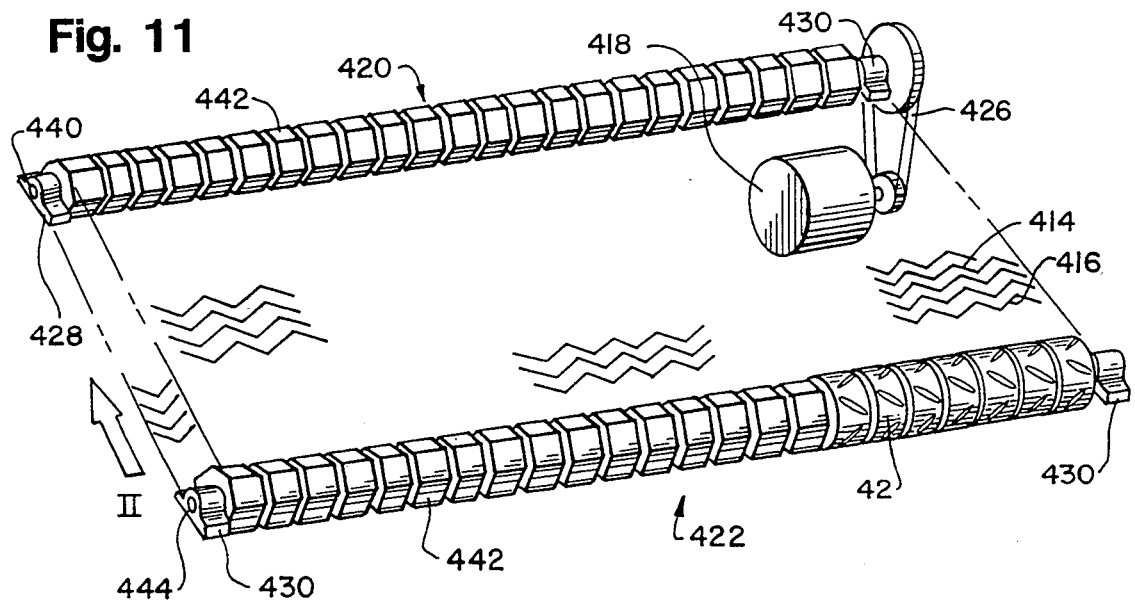
FIG. 11 is a perspective view of a conveyor system, with parts omitted for simplification and clarity, for a helical woven wire endless belt employing the claimed invention, including multiple polygonal rollers on the drive assembly and a combination of slotted rollers and polygonal rollers on the trailing assembly.

An alternative embodiment of the invention 410 is shown in FIG. 11 adapted for use with conveyor systems employing a helical, woven wire endless belt 412 with a belt travel path II. As with the embodiment shown in FIGS. 1–3, such belts may include a balanced series of alternating right-hand and left-hand helical wires 414 connected by splice wires 416, as well as other configurations such as those mentioned above.

The alternative embodiment shown in FIG. 11 also includes a power source 418 that rotates a drive assembly 420 through a transmission 426. The drive assembly 420 is mounted on bearing supports 428 and engages and propels the endless belt 412 around a trailing assembly 422 opposite the drive assembly 420. The trailing assembly is also mounted on bearing supports 430.

The drive assembly 420 shown in FIG. 11 includes at least one rotatable drive shaft 440 and a rotatable trailing shaft 444. A series of cylindrical, polygonal rollers 442 are mounted on the drive shaft 440 to support and drive the belt 412. The trailing assembly 422 shown in FIG. 11 is further provided with both the cylindrical slotted rollers 42 discussed above and the polygonal rollers 442. The polygonal rollers 442 are positioned to support the belt 412 during operation. The cylindrical slotted rollers 42 engage the belt helical wires 414 to support and align the belt 412 during operation of the system as discussed above.

Figure 12:
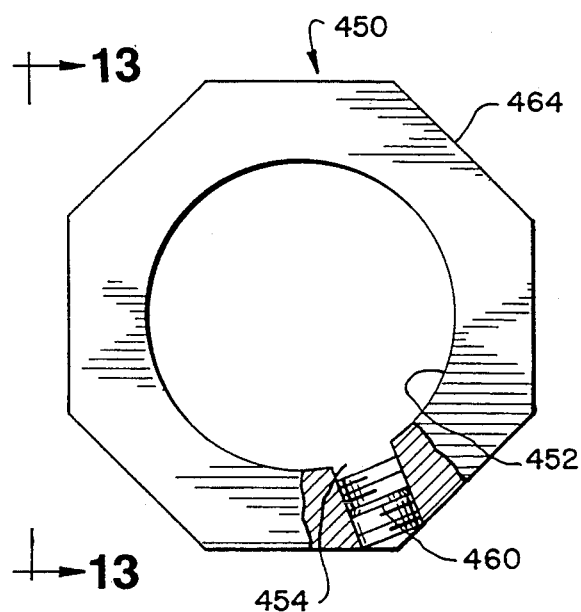
FIG. 12 is a sectional view of a polygonal roller of the invention, such as shown in FIGS. 11 and 15, with eight planar peripheral surfaces or "sides."

Examples of polygonal rollers 450 and 550 suitable for either drive or trailing assemblies are shown in FIGS. 12 and 14. Such polygonal rollers 450 and 550 are preferable provided with central bores 452 and 552 with keyways 454 and 554 disposed to receive a key flange on the drive shaft 440 or trailing shaft 444. The polygonal rollers 450 and 550 are also provided with radially extending set screw wells 460 and 560 in communication with the keyways 454 and 554 to allow the slidable positioning of the polygonal rollers 450 and 550 on the drive shaft 440. These polygonal rollers 450 and 550 may be made of the same materials as the cylindrical slotted rollers discussed above.

Figure 13:
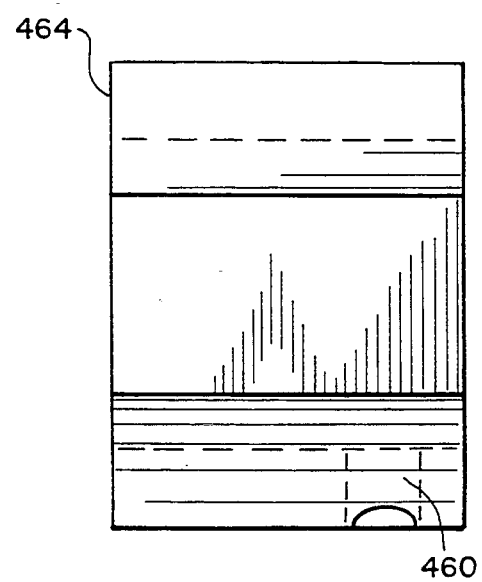
FIG. 13 is a front view of the eight-sided polygonal roller shown in FIG. 12 along line 13—13.

As shown in FIGS. 12–14, the polygonal rollers 450 and 550 are provided with exposed longitudinal, planar surfaces or "sides" 464 and 564 disposed about periphery of the rollers 450 and 550. These roller sides 464 and 564 are disposed to engage the lower portions of the belt helical wires 414 (in the case of a woven wire belt) contacting the polygonal rollers 450 and 550 to support and drive the endless belt 412. The polygonal roller 450 shown in FIG. 12 is eight sided for use with a 12-16-12-14 helical woven wire belt and the polygonal roller 550 shown in FIG. 14 is fourteen sided for a 24-16-9-12 belt.

The number of sides of polygonal rollers such as 450 and 550 will depend on the specific dimensions of the endless belts 412. In a preferred embodiment of the invention, the chordal pitch of the sides 464 and 564 of the polygonal rollers 450 and 550 are approximately the same as the chordal pitch of the endless belt 412. The optimum number of sides 464 and 550 of the polygonal rollers 450 and 550 may be determined using the method for estimating roller configurations discussed above, and specifically, steps (1) to (3) discussed above.

With this combination of polygonal rollers 442 and slotted rollers 42, the invention achieves significant cost and operational savings while providing effective and efficient drive, support and alignment to the belt 412 in certain applications. The polygonal rollers 442 effectively and efficiently drive and support the belt at a relatively low manufacturing and replacement cost. The polygonal rollers 442 do not require slots that must be properly positioned to receive depending members of the belt 412, and, thus, may be used in conditions with large temperature variations. These polygonal rollers 442 also do not utilize teeth or slots that require specialized cleaning and maintenance in food applications or systems producing significant amounts of particulate matter.

As shown in FIG. 11, the slotted rollers 42 on the trailing assembly 422 are used in combination with the polygonal rollers 442 to maintain, and support, the belt in proper alignment throughout its operation. The system shown in FIG. 11 is designed to transport loads through harsh operating conditions and requires numerous rollers to support the weight of the belt 412 and the transported product. The number of rollers used and their spacing may vary depending on the particular operating conditions and product loads. Fully slotted rollers, or the alternately slotted rollers and the rollers with "single sided" recesses discussed below may also be added to the drive assembly 420 to increase the load capacity of the system.

As FIG. 11 illustrates, the use of the polygonal rollers 442 may permit a reduction in the number of the slotted rollers 42 used in such systems. As the slotted rollers 42 are more expensive to produce and maintain that the polygonal rollers 442, the combination shown in FIG. 11 reduces the purchase cost of the system and overall maintenance costs without impairing the operation of the system.

Moreover, the embodiment shown in FIG. 11 may also be arranged to reduce the effects of expansion and construction of the belt due to temperature changes in high temperature applications, such as in metal working furnaces. For example, the drive assembly 420 may be placed in the high temperature "hot" zone of a furnace. Since the polygonal rollers 442 on the drive assembly 420 do not employ teeth or slots which must be aligned with the belt 412, the operation of the drive assembly 420 will not be significantly affected by variations to the belt dimensions due to the furnace temperatures. The trailing assembly 422 may be located in the lower temperature "cool" zone outside of the furnace where the ambient temperature is relatively constant and there is little temperature related variation in the belt dimensions which might affect the guiding and supporting functions provided by the slotted rollers 42.

Another embodiment of the invention is shown in FIGS. 15 to 19 employing the polygonal rollers 442 mentioned above in combination with rollers provided with both slots and planar peripheral surfaces such as the "sides" of polygonal rollers. These alternately slotted rollers 642 are adapted for use with a helical, woven wire endless belt 612 with a belt travel direction III that is engaged on a drive assembly 620 and a trailing assembly 622. As with the above-mentioned belts, the helical wire belt 612 includes alternating right-hand and left-hand helical wires 614 connected by splice wires 616.

The embodiment of the invention shown in FIG. 15 is also used in a system with a drive assembly 620 connected by a transmission system 626 to a power source 618 for rotating the drive assembly 620. The drive assembly 620 and the trailing assembly 622 are also mounted on bearing supports 628 and 630 respectively.

The alternately slotted rollers 642 are well suited for use with small or fine mesh endless belts. Cylindrical slotted rollers, such as the slotted roller 50 above, designed for such fine mesh belts require very closely spaced slots. In many instances, the slots on such cylindrical slotted rollers 50 will overlap causing alignment difficulties and inefficiencies during operation of the roller, particularly in operating environments with large quantities of dust or other particulate matter which may clog the slots. The alternately slotted rollers 642 of the invention avoids these difficulties by reducing the number of slots on the rollers and by using the planar surfaces such as polygonal rollers to further support, and in some instances, drive the belt. Furthermore, the open slot design permits self-cleaning of the slots during operation of the system.

In the embodiment shown in FIG. 15, the drive shaft 640 and trailing shaft 644 support multiple polygonal rollers 442 keyed to, and spaced across, the drive shaft 640 and trailing shaft 644. Alternately slotted rollers 642 are spaced between the polygonal rollers 442 on the trailing shaft 644. The number and spacing of the polygonal rollers 442 and 642 will depend on the belt configuration, load conditions and speed, among other considerations.

One example of a preferred embodiment of an alternately slotted roller 650 is shown in FIGS. 16 to 19 and may be composed of the same materials as the above-mentioned cylindrical slotted roller. This polygonal alternately slotted roller 650 includes a central bore 652, with a set screw well 660 in communication with a keyway 654, to slidably engage a key flange of the drive shaft 640 or trailing shaft 644. As shown in FIG. 17, the roller 650 is provided with a series of paired wall sections 673 and 674 disposed about its periphery defining outer peripheral surface 650a. Each set of wall sections 672 and 674 defines a slot 664 for receiving the lower portion of the belt helical wires 614 or equivalent subtending members of the belt 612. One or more planar longitudinal sides 670 of the roller 650 are interposed between the wall sections 672 and 674 to engage, support and, in some instances, drive the belt 612.

As shown in FIGS. 18 and 19, the wall sections 672 and 673 may be arranged to form "right-handed" slots 664' or "left-handed" slots 664" corresponding to the right-handed and left-handed weave of the helical wires 614 of the belt 612. The wall sections 672' and 674' form the right-hand slot 664' and the wall sections 672" and 674" form the left-hand slot 664".

As shown in FIG. 15, when the alternately slotted roller 650 is employed in a conveyor system, on the trailing assembly 623, an alternately slotted roller 666a with "right-hand" slots may be paired with a second such roller 666b with "left-hand" slots to engage helical wires with both right and left hand weaves. In other applications, a single alternately slotted roller 650 may include both "right-hand" and "left-hand" slots depending on the specific weave of the belt and the number of planar surfaces 670 interposed between the wall segments 672 and 674.

As shown in FIG. 17, the slot 664 found by wall sections 672 and 674 preferably includes inner wall abutment surfaces 672a and 674a and bottom wall surface 670a disposed to engage lower portions of belt 612 segments within the slot 664. The side wall spacing is preferably approximately twice the gauge of the belt helical wires 614 to allow for some variance in the placement of the lower portions of the belt within the slot 664. The height of the wall sections 672 and 674 is also adjusted to suit the particular configuration of the belt 612.

In the preferred embodiment, the height of the wall sections 672 and 674 approaches, but is less than, the mesh thickness of the endless belt 614. With this arrangement, the inner wall abutment surfaces 672a and 674a may effectively engage and align the belt with the minimum deleterious contact with the belt splice wires 614. As shown in FIG. 16, the leading edges 672b and 674b of the wall sections 672 and 674 may also be further tapered or beveled to reduce the possibility of contact with the belt splice wires 616, while maximizing the area of the wall abutment surfaces 672a and 674a available to guide and align the belt 612.

The chordal pitch of the slots 664 and the planar surfaces 670 employed on such alternately slotted rollers 650 will depend on the specific dimensions of the endless belts 612. In the preferred embodiment of the invention, the chordal pitch of the slots 664 and the planar surfaces 670 are approximately the same as the chordal pitch of the endless belt 612.

The optimum chordal pitch for the slots 664 and the planar surfaces 670 may also be estimated using the method for estimating roller configurations for cylindrical slotted rollers discussed above, including steps (1) to (8). The disposition and dimensions of the slots 664 may also be determined using the method for cylindrical slotted rollers described above, including steps (9) to (11).

The number of slots 664 and planar surfaces 670 interposed between the slots 664 may be varied depending on the endless belt 612 used and the specific operating conditions of the conveyor system. As shown in FIG. 5, these such alternated slotted 650 rollers have shown the advantages of the cylinder slotted roller discussed above.

They may be used with polygonal rollers to provide accurate, efficient, support and guidance for the belt 612.

A second embodiment of an alternately slotted roller 750 is shown in FIG. 20. On that roller 750, two planar surfaces 770 are interposed between the side wall segments 772 and 774 which form slots 764 and define outer peripheral surface 750a. This roller 750 is also provided with a central bore 752, keyway 754 and set screw sell 760, as were the previously described rollers of the invention.

As seen in FIGS. 20 and 21, the wall segments 772 and 774 of this version of an alternately slotted roller are located on every third side of a polygonal cylinder defined by the roller planar surfaces 770 and the bottom walls 770a of the slots 764. As in the above-mentioned first alternately slotted roller 650, the inner surfaces 772a and 774a of the wall segments 772 and 774 define the sides of the slot 764. These wall segment inner surfaces 772a and 774a and the bottom wall 770a are similarly disposed to engage depending portions of an endless conveyor belt to align, support and, in some applications, drive the belt. The dimensions for this second embodiment of the invention may be determined as for the first embodiment 650 and may be made of similar materials.

The slots 764 defined by wall segments 772 and 774 as shown in FIG. 21 are also disposed in an alternating "right-hand" and "left-hand" position to correspond with orientation of the helical wire segments of the belt 614. As two planar surfaces 770 are interposed between each pair of wall segments 772 and 774, a single roller 750 may include both "right-hand" and "left-hand" slots.

A third embodiment of an alternately slotted roller 850 is shown in FIGS. 22 and 23. In this embodiment, the roller 850 is provided with slots 864a and 864b and outer peripheral surface 850a defined by the sets of wall segments 872, 874 and 876 disposed in multiple circumferential rows across the width of the roller 850. As with the multi-row cylindrical rollers 66a and 68a discussed above, the multi-row alternately slotted roller 850 is configured to engage multiple segments of an endless conveyor belt.

The slots 864 and 864a and wall segments 872, 874 and 876 of the multi-row roller 850 are arranged in a staggered orientation across the width of the roller to provide continuous alignment and support to the belt during operation of the system. The slots 864 and 864a also alternate between a "right-hand" and "left-hand" orientation to correspond to the alternating weave helical wire belts. Such multi-row alternately slotted rollers 850 are particularly suited for high load and high stress application where additional stability and aligning action is required.

Figure 24:
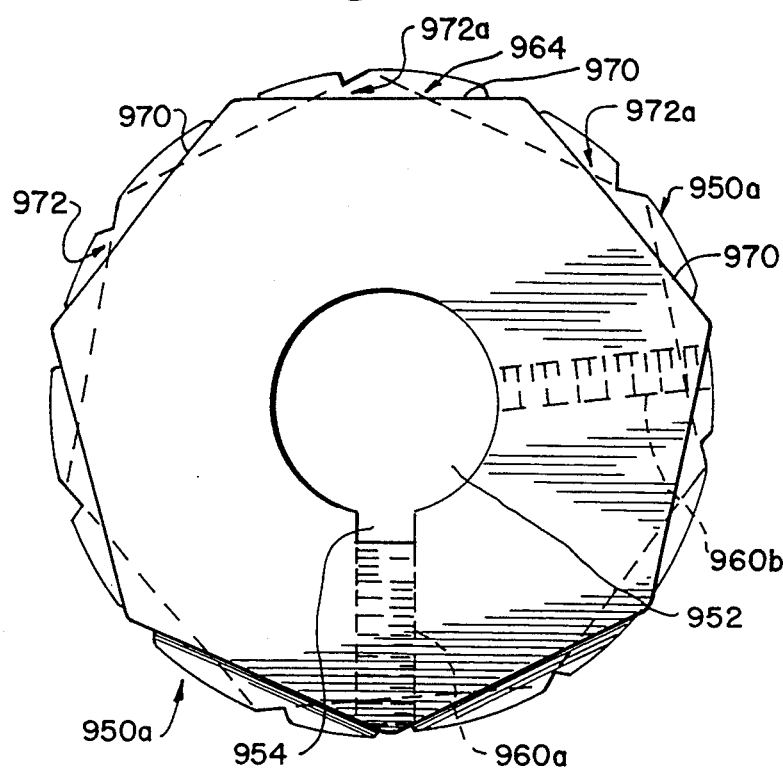
FIG. 24 is a side elevation view of another embodiment of the invention with "single-sided" recesses.
Figure 25:
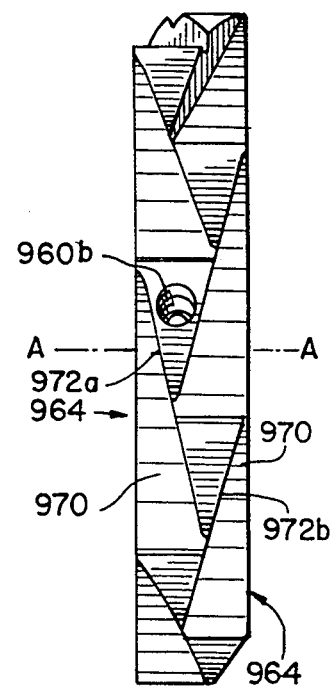
FIG. 25 is a front view of the embodiment of the invention shown in FIG. 24.

An additional embodiment of a roller of the invention is shown in FIGS. 24 and 25. In this embodiment, the roller 950, with an outer peripheral surface 950a, includes a central bore 952 with a set screw bore 960a in communication with a keyway 954 to slidably engage a key flange of a drive shaft or a trailing shaft as such as those discussed above. A second set screw bore 960b in communication with the central bore 952 may also be provided to further lock the roller in place on the appropriate shaft.

As shown in the FIG. 24, the roller 950 is provided with a series of wall sections 972 disposed about its periphery defining recesses 964 for receiving the depending segments or elements of the belt 12 discussed above. These wall sections 972, as shown in FIG. 25, are arranged in at least one circumferential row about the periphery of the roller 950. As shown in the figures, the wall sections 972 are preferably spaced at regular intervals around the periphery of the roller 950, but this may be varied depending on the specific belt used and size of the belt mesh openings. The width of the roller 950 shown in the figures is sufficient to accommodate a circumferential row of wall sections 972, but the roller width may be increased to accommodate additional rows of wall sections 972 as well.

As shown in FIG. 25, the wall sections 972 are preferably disposed at an angle relative to the longitudinal axis A—A of the roller. The angles of the wall section 972 correspond to the pitch of the portion or elements of the endless belt 12 that engage the roller 950. A preferred embodiment for helical wire belts shown in the figures is provided with one row of wall sections 972a oriented to accept helical wires with a right-hand pitch and one row of wall sections 972b oriented to accept helical wires with a left-hand pitch. The spacing of the wall sections 972a and 972b will depend on the belt mesh and belt wire gauge. The roller shown in FIGS. 24 and 25 is intended for a 24-16-9-12 helical wire belt.

As shown in FIGS. 24 and 25, the recesses 964 further include a bottom walls 970 spaced a sufficient distance from the outer peripheral surface 950a to accommodate the full lower portion of a turn or "loop" of a helical wire. In the embodiment shown for a 24-16-9-12 belt, this distance is about 0.14". The disposition of the wall segments 972, and the bottom walls 970 provide an angular engagement with the loop of helical wire within the recess 964 to support and align, and in some applications drive, the belt 12.

As shown in the figures, the recesses 964 are open along one side, opposite the wall sections 972, so that foreign matter which would otherwise clog or fill the recesses 964 may be relatively easily dislodged from the roller 950 during operation of the system. In systems employing alternately left and right handed single sided recesses 964, with multiple rows of the wall segments 972, the recesses 964 may be bounded on one side by wall segments 972a and on the other side by one or more left handed segments 972b. In such configuration, the recess 964 formed thereby will also be sufficiently broad i.e., with sufficient longitudinal width, to encourage the dislodgment of debris from the roller 950.

The dimensions of the roller 950, the wall segments 972, the wall segment angles, and the spacing of wall segments may be determined using the methods described above for the single sided recesses shown in the figures. Similarly, the roller 950 may be made of the materials discussed above; may be used on either driving or trailing assemblies; and may be used in conjunction with any of the roller embodiments discussed above appropriate for the specific application.

The self-cleaning feature of the roller 1050 are particularly helpful when or harsh applications are used where debris, particulate matter or other such materials may coat or fall on the surface of the rollers 1050. Such foreign matter may clog the slots of the roller embodiments discussed above, interfering with proper engagement of the rollers and belt, and in some instances, may result in loss of belt alignment or belt mis-tracking. Thus, the self-cleaning feature of the rollers 950 may result in considerable time savings and reduction in maintenance costs in such applications. The belt 12 also will be more likely to stay on track and run with the minimum amount of wear and tear. This may result in reduced down time for the system, increased operating efficiency and reduced labor costs.

The embodiment illustrated in FIGS. 24 and 25 may be used in conjunction with other rollers of the same construction, or with the fully slotted rollers, with the polygonal rollers and with the alternately slotted rollers discussed above. The number of rollers used will depend on the particular system and the mix of roller designs used. One example of such a system uses one or two rollers of the type shown in FIGS. 24 and 25 to align, support and drive the belt, along with four or more polygonal rollers as discussed above to support and drive the belt.

Figure 26:
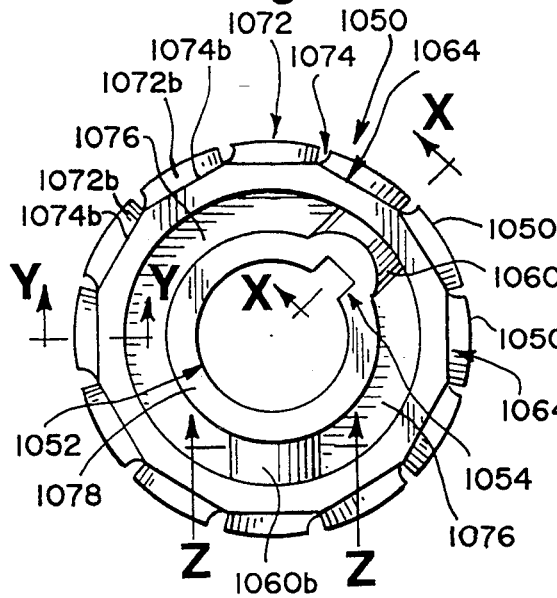
FIG. 26 is an elevation view of a first side of a further embodiment of the invention with "single-sided" recesses.
Figure 27:
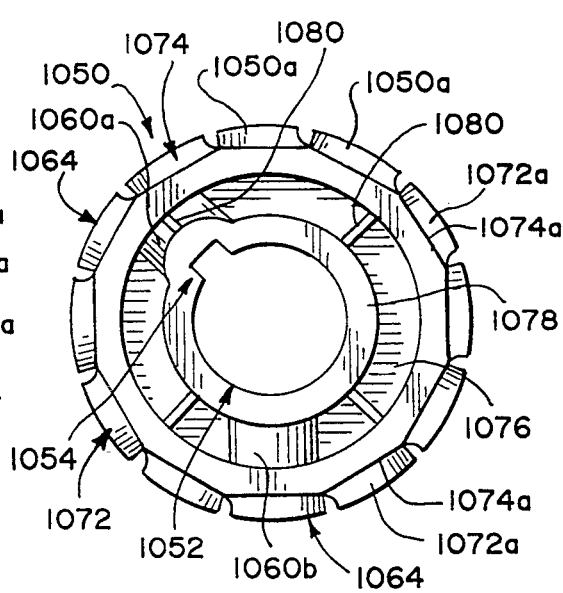
FIG. 27 is an elevation view of a second side of the embodiment with "single-sided" recesses shown in FIG. 26.
Figure 28:
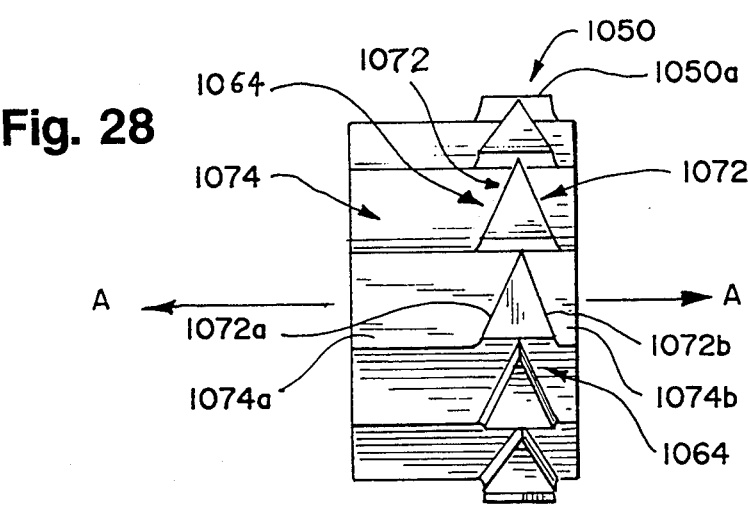
FIG. 28 is a front view of the embodiment with "single-sided" recesses shown in FIG. 26.

A further embodiment of a roller of the invention is shown in FIGS. 26 to 28. In this embodiment, the roller 1050, with an outer peripheral surface 1050a, includes a central bore 1052 with a set screw member 1060a which is adapted to receive a threaded bore in communication with a keyway 1054. A set screw may be inserted in such a bore to engage a key flange of a drive shaft or a trailing shaft such as those discussed above and lock the roller 1050 in place. A second set screw member 1060b may also be provided which is adapted to receive a second set screw bore and set screw to further lock the roller 1050 in place on the appropriate shaft.

As shown in FIGS. 26 to 28, the roller 1050 is provided with a series of wall sections 1072 disposed about the circumference of the roller 1050 defining recesses 1064 for receiving the depending segments or elements of the belt 12 discussed above. In the embodiment shown, two sets of wall sections 1072a and 1072b are provided, which define corresponding sets of recesses. The wall sections 1072, as shown in the figures, are arranged in at least one circumferential row. As shown in the figures, the wall sections 1072 are also preferably spaced at regular intervals, and this spacing may be varied depending on the specific belt used and size of the belt mesh openings. The roller 1052 shown in FIGS. 26 to 28 accommodates two circumferential rows of wall sections 1072, and additional rows of wall sections 1072 may be added depending on the application.

As shown in FIGS. 26 to 28, the wall sections 1072 are preferably disposed at an angle relative to the longitudinal axis A—A of the roller 1050. The angles of the wall sections 1072 correspond to the pitch of the portion or elements of the endless belt 12 that engage the roller 1052. A preferred embodiment for helical wire belts shown in the figures is provided with one row of wall sections 1072a oriented to accept helical wires with a right-hand pitch and one row of wall sections 1072b oriented to accept helical wires with a left-hand pitch. The spacing of the wall sections 1072a and 1072b will depend on the particular belt mesh and belt wire gauge.

As shown in FIGS. 26, 27 and 28, the recesses 1064 may further include planar surfaces 1074 adjacent to the base of the wall sections 1072, extending a predetermined distance from the base of the wall sections 1072, and spaced a sufficient distance from the outer peripheral surface 1050a to accommodate and support the lower portions of a turn or "loop" of a helical wire. In the embodiment shown in the figures, this distance is about 0.125 inches. The planar surfaces 1074 may extend a distance from the base of the wall segments 1072 sufficient to support one or more rows of loops of the belt helical wire. As shown in FIG. 28, the distance the planar surfaces 1074 extend from the wall segments 1072 need not be identical. In that embodiment the axial length of planar surfaces 1074a which extend from the base of the wall segments 1072a are greater than the axial length of planar surfaces 1074b which extend from the base of the wall segments 1072b.

The disposition of the wall segments 1072a and 1072b provide an angular engagement with the loops of helical wire within the recesses 1064 to support and align, and in some applications drive, the belt 12. Furthermore, the disposition of the planar surfaces 1074 provides support for the loops within the recesses 1064, which may include helical wire loops that are not otherwise engaged by the wall segments 1072. FIG. 28 depicts one example of such planar surfaces 1074a. As shown in the figures, the recesses 1064 also are open along one side, opposite the wall sections 1072, so that foreign matter which would otherwise clog or fill the recesses 1064 may be relatively easily dislodged from the roller 1050 during operation of the system.

As shown in FIGS. 26, 26a, 26b and 27, the interior portions of that embodiment are particularly well suited for manufacture by plastic molding techniques. This embodiment includes radially extending web members 1076 which may be recessed from an outer edge of the rollers. Preferably, this web 1076 is located below the wall segments 1072 to further strengthen the rollers 1050. The web 1076 joins an interior generally cylindrical support 1078 to the exterior portions of the roller 1050. The support member 1078 further defines the central bore 1052 and keyway 1054.

Figure 26B:
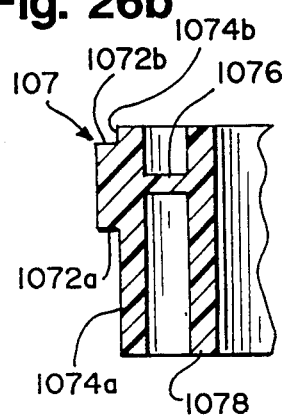
FIG. 26b is a partial cross-sectional view of the embodiment shown in FIG. 26 through line Y—Y.
Figure 26A:
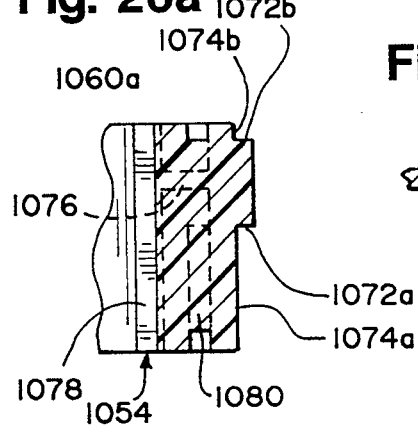
FIG. 26a is a partial cross-sectional view of the embodiment shown in FIG. 26 through line X—X.
Figure 26C:
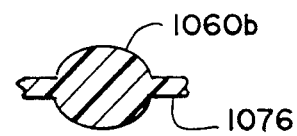
FIG. 26c is a partial cross-sectional view of a set screw member of the embodiment shown in FIG. 26 through line Z—Z.

In addition, as shown in FIGS. 26a and 27, the roller 1050 is also provided with radially extending support struts 1080 which also join the support member 1078 to the exterior portions of the roller 1050. These struts 1080 may also be recessed from an outer edge of the roller 1050. Thus, this embodiment provides a strong and durable roller 1050 that may be made using a minimum amount of material.

In one preferred embodiment of the roller shown in FIGS. 26 to 28, there are an odd number of sets of recesses 1064, corresponding sets of wall sections 1072 and corresponding sets of planar surfaces 1074 disposed about the circumference of the roller 1050. Hence, each wall section 1072a and 1072b alternately engages corresponding "left handed" or "right handed" helical wire loops. This significantly increases the life of the roller 1050 because with each rotation of the roller 1050 only one out of every two wall sections 1072 is engaged with a belt helical wire.

The dimensions of the roller 1050, the wall segments 1072, the angles of the wall segment 1072, and the spacing of wall segments 1072, and the chordal pitch of the planar surfaces 1074, may be determined using the methods described above. Similarly, the roller 1050 may be made of the materials discussed above and the roller 1050 may be used on either driving or trailing assemblies. The embodiment shown in FIGS. 26 to 28 is shown as made with injection moldable plastics, such as nylon plastics, and may be used in connection with any of the roller embodiments discussed above appropriate for the specific application.

The reduced wear and self-cleaning features of the roller 1050 are particularly helpful when dirty or harsh applications are used where debris, particulate matter or other such materials may coat or fall on the surface of the rollers 1050. Thus, the self-cleaning feature of the rollers 1050 may result in considerable time savings and reduction in maintenance costs. The belts 12 also will be more likely to stay on track and run with the minimum amount of wear and tear. This may result in reduced down time for the system, increased operating efficiency and reduced labor costs.

The embodiment illustrated in FIGS. 26 to 28 may be used in conjunction with other rollers of the same construction, or with the fully slotted rollers, with the polygonal rollers and with the alternately slotted rollers discussed above. The number of rollers used will depend on the particular system and the mix of roller designs used.

Thus, the invention provides a drive for endless belt conveyor systems that efficiently supports and advances the endless belt while maintaining the belt in proper alignment without additional devices or guides. Depending on the roller configuration used, the drive of the invention may be reversible. The invention further operates effectively in a variety of operating conditions, including systems with relatively high belt loads, temperature ranges and variations, restricted space limitations, side loading, inclines, extensive particular matter, debris and the like.

The invention, in addition, provides a drive that is relatively simple and cost effective to manufacture. The invention further efficiently utilizes the available vertical space in conveyor systems to permit the use of belts with larger wire mesh configurations. Thus, the invention provides significant cost savings to the end users, as well as to the original equipment manufacturers. The invention also provides a drive for endless conveyor belt systems that is easily maintained and includes replaceable, flexible and relatively inexpensive components.

While the invention has been described by reference to certain specific descriptions and examples which illustrate preferred material, configurations and conditions, it is understood that the invention is not limited thereto. Rather, all alternatives, modifications and equivalents within the scope and spirit of the invention so described are considered to be within the scope of the appended claims.

What is claimed is:

1. A drive for an endless conveyor belt having exposed, spaced segments at one surface of said belt, said segments including first segments disposed at a first acute angle to the width of said belt and second segments disposed at a second acute angle to width of said belt, comprising:
    at least one roller defining a generally cylindrical outer peripheral surface and having a central longitudinal axis about which said roller rotates in normal use;
    said roller including a plurality of sets of recesses in said peripheral surface to accommodate said belt segments therein, each of said sets of recesses including at least one first recess with a first abutment surface disposed at about said first acute angle to engage said first belt segments within said first recess and at least one second recess spaced longitudinally from said first recess with a second abutment surface disposed at about said second acute angle to engage said second segments within said second recess;
    said first abutment surfaces being of sufficient length and extending longitudinally at said first acute angle to engage said first belt segments received in said first recesses in a supporting and aligning relation and said second abutment surfaces being of sufficient length and extending longitudinally at said second acute angle to engage said second belt segments received in said second recesses in a supporting and aligning relation when said conveyor belt is engaged on said roller.

2. The drive of claim 1 wherein said abutment surfaces being of sufficient length and extending longitudinally at an acute angle to said longitudinal axis whereby said belt segments will be received in said recesses and engaged by said abutment surfaces in a driving, supporting and aligning relation when said conveyor belt is engaged on said roller.

3. The drive of claim 1 wherein a plurality of sets of said recesses are symmetrically disposed about said peripheral surface of said roller means in at least one circumferential row.

4. The drive of claim 3 wherein said circumferential row is provided with an odd number of said sets of recesses.

5. A drive for an endless conveyor belt having exposed, spaced segments at one surface of said belt comprising:

at least one roller defining a generally cylindrical outer peripheral surface and having a central longitudinal axis about which said roller rotates in normal use;

said roller including a plurality of sets of a first recess and a second recess longitudinally spaced from said first recess in said peripheral surface to accommodate said belt segments therein, each of said first and second recesses including at least one abutment surface disposed to engage said belt segments within said recesses, said abutment surfaces of said first recesses extending at a first acute angle to said longitudinal axis and said abutment surfaces of said second recesses extending at a second, opposite acute angle to said longitudinal axis;

each of said first and second recesses also including at least one generally axially extending support surface below said peripheral surface; and said abutment surfaces and said support surfaces of each said recess disposed to cooperatively engage said belt segments received in said recesses in a supporting and aligning relation when said conveyor belt is engaged on said roller.

6. The drive of claim 5 wherein said abutment surface and support surface cooperatively engage said belt segments in a supporting, aligning and driving relation.

7. The drive of claim 5 wherein said first and second recesses of each of said sets of recesses comprises at least one common side wall, said side wall having a base portion below said peripheral surface; a portion of said side wall forming said first and second abutment surfaces; and said support surfaces of said first and second recesses extending axially from said base portion of said side wall.

8. The drive of claim 5 wherein said support surfaces of said first recesses are generally planar and have an axial length sufficient to engage more than one belt segment in a supporting relation when said belt is engaged on said roller.

9. The drive of claim 5 wherein said belt segments have a predetermined first chordal pitch and said support surfaces have a second chordal pitch generally the same as said first chordal pitch.

10. The drive of claim 5 wherein said roller includes at least one circumferential row of said sets of recesses and each of said rows includes an odd number of said recesses.

11. A drive for an endless conveyor belt having exposed, spaced segments at one surface of said belt comprising:

at least one roller having a central longitudinal axis about which said roller rotates in normal use, said roller provided with a first generally cylindrical outer member defining a generally cylindrical outer peripheral surface; a second generally cylindrical inner member adapted to receive a shaft therethrough; and a radially extending web operatively joining said first outer member and said second inner member;

said roller including recesses in said peripheral surface to accommodate said belt segments therein, each of said recesses including at least one abutment surface disposed to engage said belt segment within said recesses said abutment surfaces being of sufficient length and extending longitudinally at an acute angle to said longitudinal axis;

each of said recesses also including at least one generally axially extending support surface below said peripheral surface; and said abutment surface and said support surface of each recess disposed to cooperatively engage said belt segments received in said recesses in a supporting and aligning relation when said conveyor belt is engaged on said roller.

12. The drive of claim 11 wherein radially extending strut members are operatively join said first outer member and second inner member.

* * * * *